(12) United States Patent
Lee et al.

(10) Patent No.: US 11,662,584 B2
(45) Date of Patent: May 30, 2023

(54) GRADIENT REFRACTIVE INDEX GRATING FOR DISPLAY LEAKAGE REDUCTION

(71) Applicant: Meta Platforms Technologies, LLC, Menlo Park, CA (US)

(72) Inventors: Hee Yoon Lee, Kirkland, WA (US); Yu Shi, Redmond, WA (US); Elliott Franke, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 180 days.

(21) Appl. No.: 17/124,807

(22) Filed: Dec. 17, 2020

(65) Prior Publication Data

US 2021/0199971 A1     Jul. 1, 2021

Related U.S. Application Data

(60) Provisional application No. 62/953,822, filed on Dec. 26, 2019.

(51) Int. Cl.
    *G02B 27/01*     (2006.01)
    *G02B 6/34*     (2006.01)

(52) U.S. Cl.
    CPC ........... *G02B 27/0172* (2013.01); *G02B 6/34* (2013.01); *G02B 2027/0178* (2013.01)

(58) Field of Classification Search
    None
    See application file for complete search history.

(56) References Cited

U.S. PATENT DOCUMENTS

| | | | |
|---|---|---|---|
| 6,522,812 B1 | 2/2003 | Nikonov | |
| 8,617,912 B2* | 12/2013 | Yanagisawa | H01S 5/1231 438/31 |
| 8,989,537 B2* | 3/2015 | Mossberg | G02B 5/1809 385/37 |
| 10,241,269 B1 | 3/2019 | Jacob et al. | |
| 10,845,526 B1 | 11/2020 | Lee et al. | |
| 11,099,309 B2 | 8/2021 | Lee et al. | |

(Continued)

FOREIGN PATENT DOCUMENTS

CN     108387960 A     8/2018

OTHER PUBLICATIONS

International Search Report and Written Opinion for International Application No. PCT/US2020/044665, dated Nov. 10, 2020, 9 Pages.

(Continued)

*Primary Examiner* — Elmito Breval
(74) *Attorney, Agent, or Firm* — Weaver Austin Villeneuve & Sampson LLP

(57) ABSTRACT

A waveguide display includes a waveguide, an input coupler configured to couple display light into the waveguide, and a surface-relief grating on the waveguide and configured to couple the display light out of the waveguide towards an eyebox of the waveguide display on a first side of the waveguide. The surface-relief grating is formed in a plurality of grating layers having uniform or non-uniform thickness profiles. The plurality of grating layers is characterized by a refractive index modulation that increases and then decreases as the distance of the grating layer from the waveguide increases.

20 Claims, 21 Drawing Sheets

(56) References Cited

U.S. PATENT DOCUMENTS

| | | | |
|---|---|---|---|
| 2006/0001969 A1* | 1/2006 | Wang | G11B 7/1365 |
| | | | 359/489.06 |
| 2012/0064303 A1* | 3/2012 | Yashiki | G02B 5/1842 |
| | | | 427/162 |
| 2012/0120493 A1 | 5/2012 | Simmonds et al. | |
| 2014/0140653 A1 | 5/2014 | Brown et al. | |
| 2014/0140654 A1 | 5/2014 | Brown et al. | |
| 2015/0063753 A1 | 3/2015 | Evans et al. | |
| 2016/0274281 A1 | 9/2016 | Lutolf et al. | |
| 2017/0131551 A1 | 5/2017 | Robbins et al. | |
| 2017/0307887 A1 | 10/2017 | Stenberg et al. | |
| 2018/0081176 A1 | 3/2018 | Olkkonen et al. | |
| 2019/0212589 A1 | 7/2019 | Waldern et al. | |
| 2019/0212699 A1 | 7/2019 | Waldern et al. | |
| 2020/0012093 A1 | 1/2020 | Marshall | |
| 2020/0158943 A1 | 5/2020 | Calafiore | |

OTHER PUBLICATIONS

International Search Report and Written Opinion for International Application No. PCT/US2020/044671, dated Nov. 13, 2020, 9 Pages.
International Search Report and Written Opinion for International Application No. PCT/US2020/066927, dated Mar. 23, 2021, 11 Pages.
Non-Final Office Action dated Apr. 15, 2020 for U.S. Appl. No. 16/549,508, filed Aug. 23, 2019, 10 pages.
Notice of Allowance dated Jun. 17, 2021 for U.S. Appl. No. 16/549,567, filed Aug. 23, 2019, 9 pages.
Notice of Allowance dated Jul. 28, 2020 for U.S. Appl. No. 16/549,508, filed Aug. 23, 2019, 8 pages.

* cited by examiner

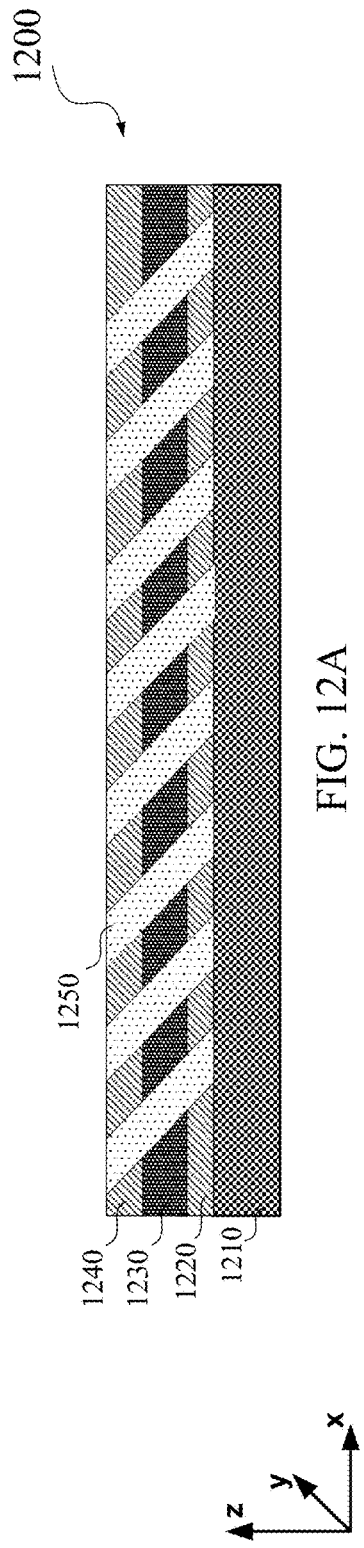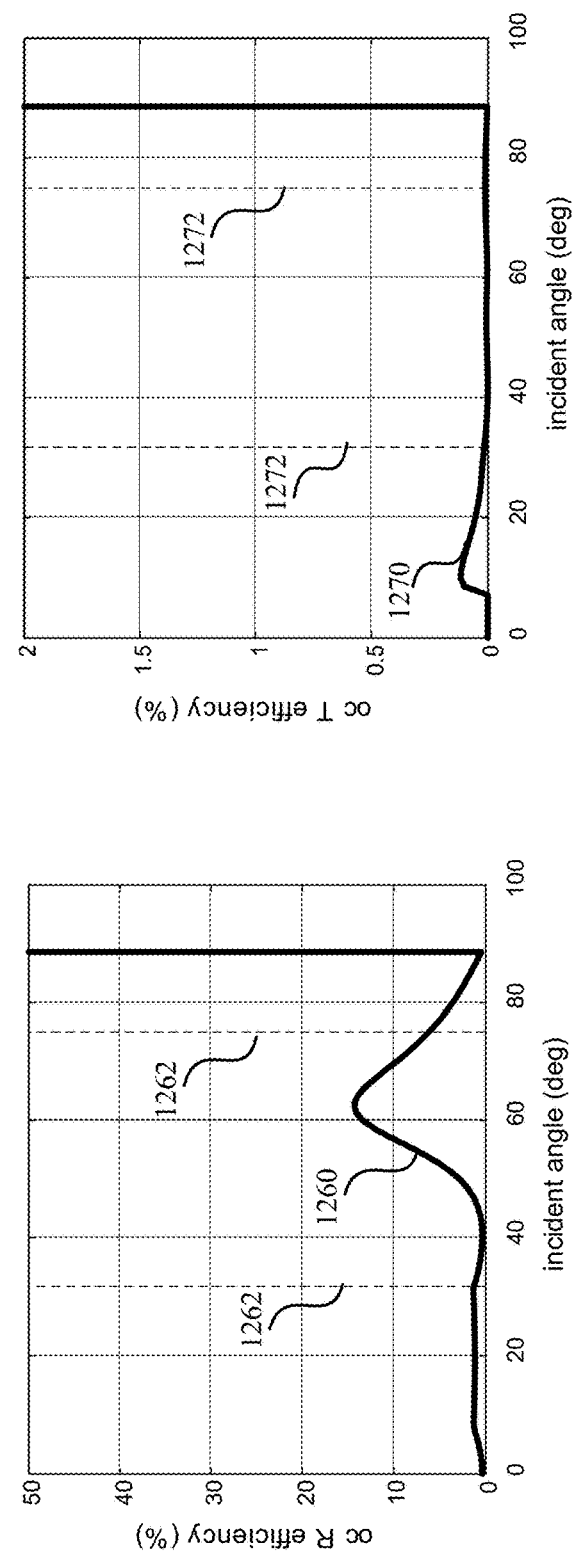
FIG. 12A
FIG. 12B
FIG. 12C

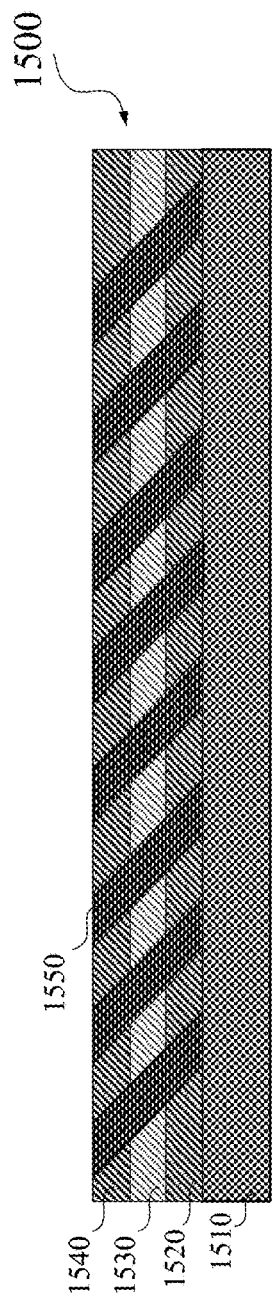
FIG. 15A
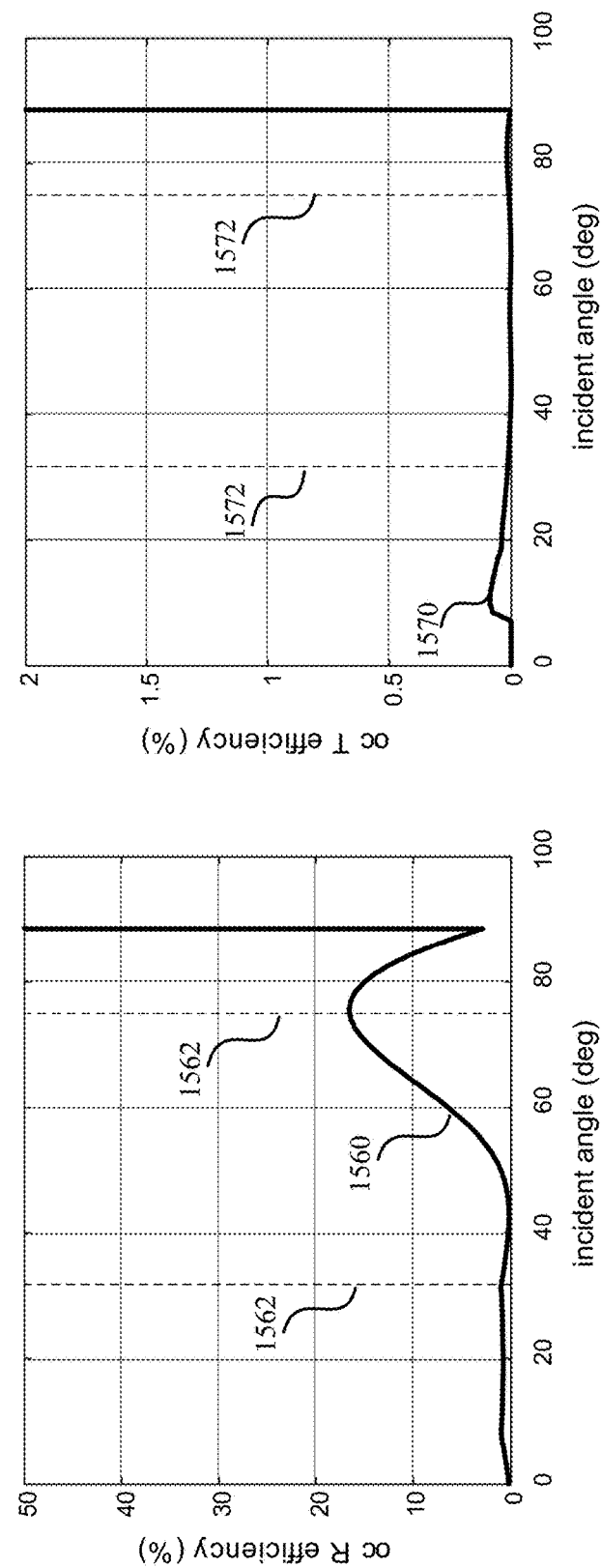
FIG. 15B
FIG. 15C

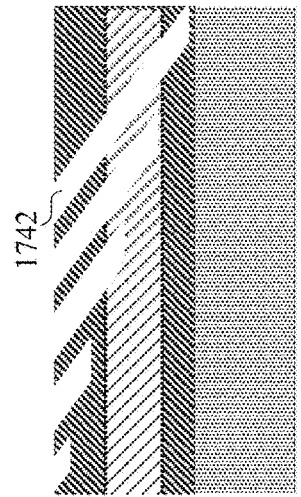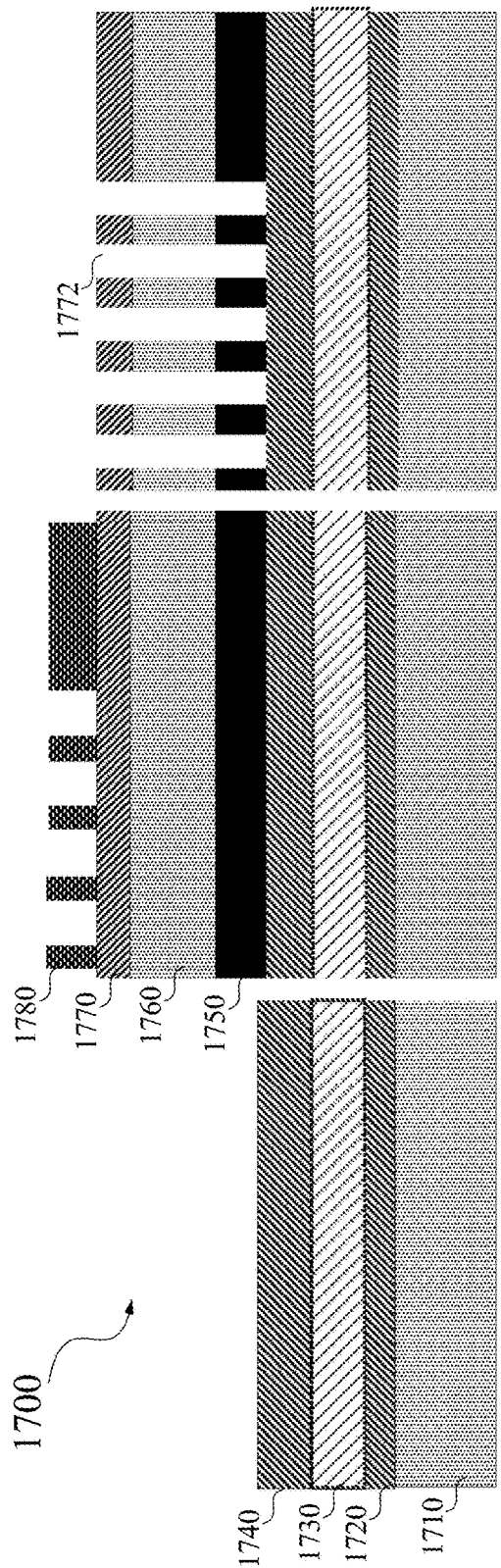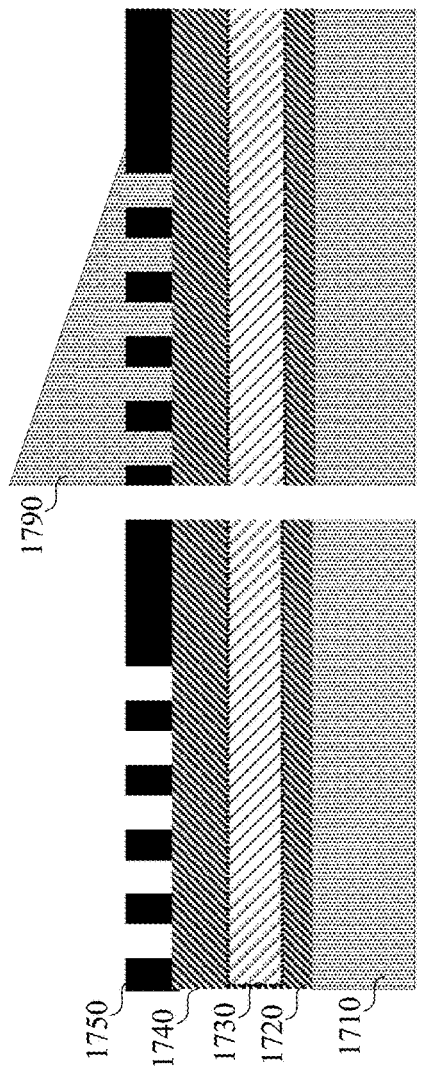
FIG. 17A  FIG. 17B  FIG. 17C  FIG. 17D  FIG. 17E  FIG. 17F

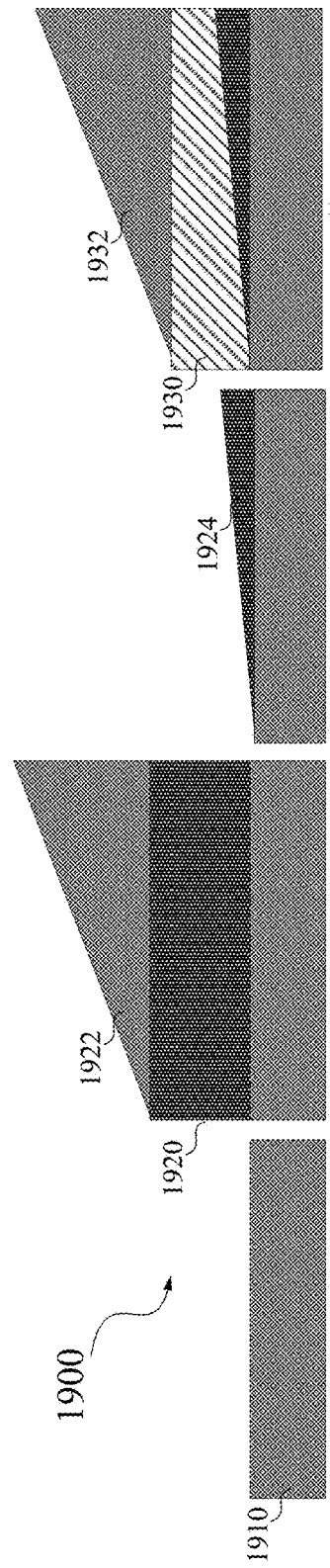
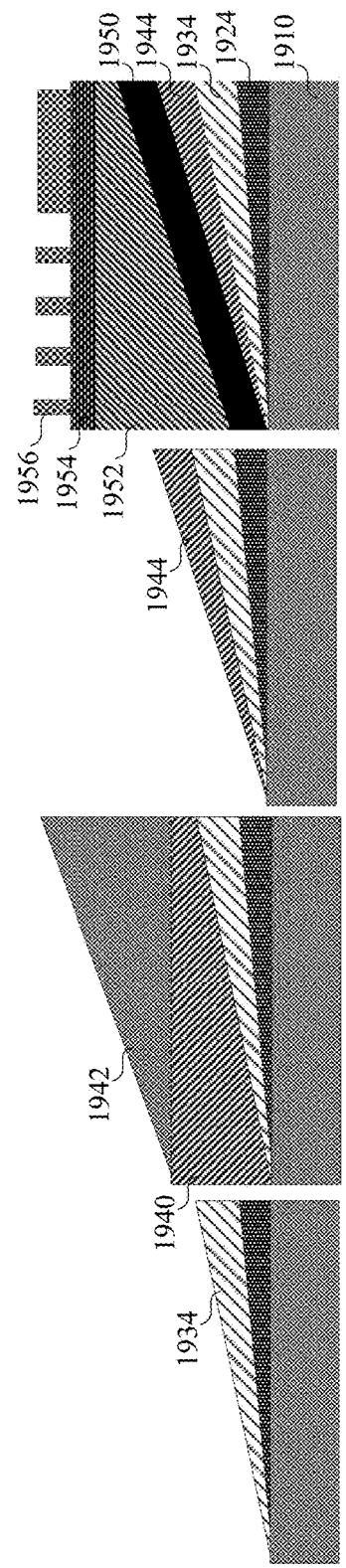
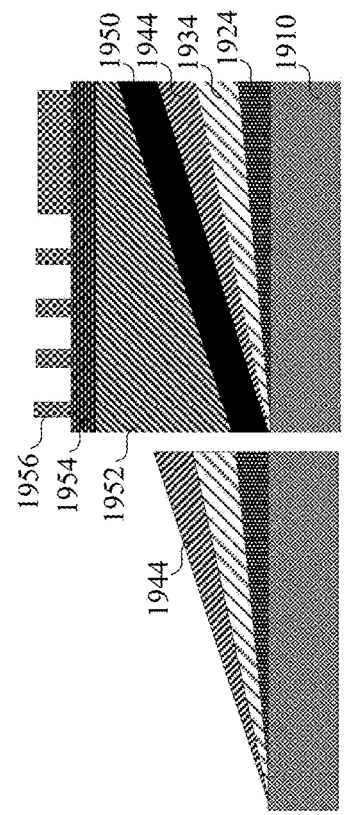
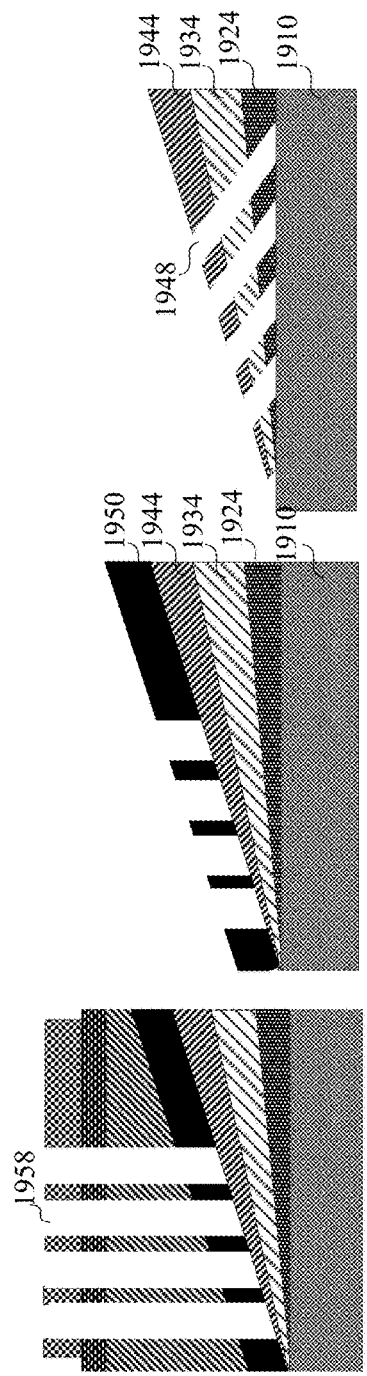

GRADIENT REFRACTIVE INDEX GRATING FOR DISPLAY LEAKAGE REDUCTION

CROSS-REFERENCE TO RELATED APPLICATIONS

This application claims the benefit of and priority to U.S. Provisional Application No. 62/953,822, filed Dec. 26, 2019, entitled "GRADIENT REFRACTIVE INDEX GRATING FOR DISPLAY LEAKAGE REDUCTION," which is incorporated herein by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a grating. Light from the surrounding environment may pass through a see-through region of the waveguide and reach the user's eyes as well.

SUMMARY

This disclosure relates generally to artificial reality display. More specifically, techniques disclosed herein relates to reducing display leakage in optical see-through waveguide displays for augmented reality or mixed reality systems. In one embodiment, a waveguide-based near-eye display may include grating couplers that may diffractively couple display light into or out of a waveguide and refractively transmit ambient light through the waveguide. Each of the grating couplers may include two or more grating layers having different respective refractive indices and/or thickness profiles to reduce the coupling of display light out of the waveguide display towards the ambient environment. Various inventive embodiments are described herein, including devices, systems, methods, materials, and the like.

According to certain embodiments, a waveguide display may include a waveguide and an input coupler configured to couple display light into the waveguide. The waveguide display may also include one or more surface-relief gratings on the waveguide and configured to couple the display light out of the waveguide towards an eyebox of the waveguide display on a first side of the waveguide. The one or more surface-relief gratings may be formed in a plurality of grating layers. The plurality of grating layers may include: a first grating layer characterized by a first thickness profile and a first refractive index; a second grating layer characterized by a second thickness profile and a second refractive index different from the first refractive index; and a third grating layer characterized by a third thickness profile and a third refractive index different from the second refractive index. The second grating layer may be between the first grating layer and the third grating layer. The first thickness profile, the first refractive index, the second thickness profile, the second refractive index, the third thickness profile, and the third refractive index may be configured to reduce coupling of the display light to a second side of the waveguide opposing the first side.

In some embodiments of the waveguide display, the plurality of grating layers may be characterized by a refractive index modulation that increases and then decreases with an increase in a distance from the waveguide. In some embodiments, the plurality of grating layers may be characterized by a refractive index that increases and then decreases with an increase in a distance from the waveguide. For example, the second refractive index may be greater than each of the first refractive index, the third refractive index, and a fourth refractive index of the waveguide. The first refractive index may be the same as or different from the third refractive index. In some embodiments, the plurality of grating layers may be characterized by a refractive index that decreases and then increases with an increase in a distance from the waveguide. For example, the second refractive index may be lower than each of the first refractive index and the third refractive index. The second grating layer may be characterized by a refractive index modulation greater than about 0.1. An efficiency of the coupling of the display light to the second side of the waveguide may be less than about 1.0%. In some embodiments, the first thickness profile may be different from the second thickness profile. The first thickness profile may include a uniform or non-uniform thickness profile in one or two dimensions.

In some embodiments, the one or more surface-relief gratings may include a slanted surface-relief grating including a plurality of grating grooves in the plurality of grating layers. The plurality of grating grooves may be characterized by non-uniform depths. Each of the plurality of grating grooves may extend through all grating layers in the plurality of grating layers. The one or more surface-relief gratings may also include an overcoat layer on the plurality of grating layers, where the overcoat layer may fill the plurality of grating grooves and may be characterized by a fourth refractive index different from (e.g., greater than or lower than) the first refractive index, the second refractive index, and the third refractive index. In some embodiments, at least one surface-relief grating of the one or more surface-relief gratings may be characterized by at least one of a non-uniform grating period or a non-uniform duty cycle.

According to certain embodiments, a surface-relief grating coupler may include a substrate and a plurality of grating layers on the substrate. The plurality of grating layers may include: a first grating layer characterized by a first thickness profile and a first refractive index; a second grating layer characterized by a second thickness profile and a second refractive index different from the first refractive index; and a third grating layer characterized by a third thickness profile and a third refractive index different from the second refractive index. The second grating layer may be between the first grating layer and the third grating layer. The plurality of grating layers may include a plurality of grating grooves formed in the plurality of grating layers, where the plurality of grating grooves may be slanted with respect to the substrate and may be characterized by non-uniform depths. The surface-relief grating coupler may also include an overcoat layer on the plurality of grating layers, the overcoat layer filling the plurality of grating grooves.

In some embodiments, the plurality of grating layers may be characterized by a refractive index modulation that increases and then decreases with an increase in a distance from the substrate. In some embodiments, the first thickness profile may include a first non-uniform thickness profile, and the second thickness profile may include a second non-uniform thickness profile. In some embodiments, each of the plurality of grating grooves may extend through all grating layers in the plurality of grating layers. In some embodiments, the plurality of grating grooves may be characterized by at least one of non-uniform depths, non-uniform pitches, or non-uniform widths.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 12A illustrates an example of a grating coupler with a refractive index gradient for a waveguide display according to certain embodiments.

FIG. 12B includes a diagram illustrating the outcoupling efficiency by the reflective diffraction of the grating coupler of FIG. 12A as a function of the angle of incidence.

FIG. 12C includes a diagram illustrating the outcoupling efficiency by the transmissive diffraction of the grating coupler of FIG. 12A as a function of the angle of incidence.

FIG. 15A illustrates another example of a grating coupler with a refractive index gradient for a waveguide display according to certain embodiments.

FIG. 15B includes a diagram illustrating the outcoupling efficiency by the reflective diffraction of the grating coupler of FIG. 15A as a function of the angle of incidence.

FIG. 15C includes a diagram illustrating the outcoupling efficiency by the transmissive diffraction of the grating coupler of FIG. 15A as a function of the angle of incidence.

FIGS. 17A-17F illustrate an example of a process for manufacturing a grating coupler with a gradient refractive index and a variable grating depth according to certain embodiments.

FIGS. 19A-19K illustrate an example of a process for manufacturing a grating coupler with a variable grating depth in multiple layers that have different thickness profiles and different refractive indices for reducing display light leakage in a waveguide display according to certain embodiments.

Figure 1:
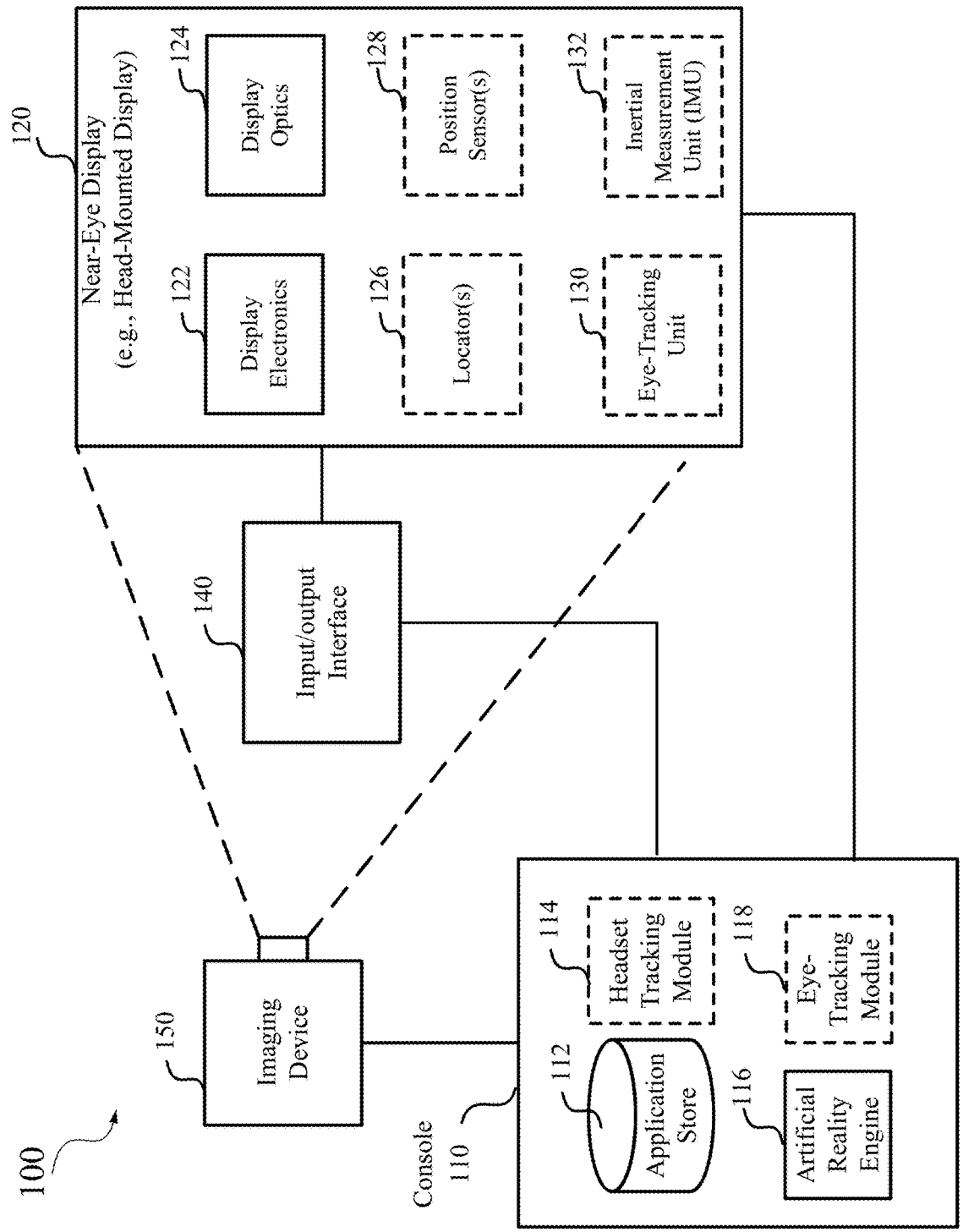
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to artificial reality display systems. More specifically, and without limitation, disclosed herein are optical see-through waveguide displays for augmented reality or mixed reality systems with reduced display light leakage. Various inventive embodiments are described herein, including devices, systems, methods, materials, and the like.

In an optical see-through waveguide display system, display light may be coupled into a waveguide and then coupled out of the waveguide by grating couplers towards user's eye. The waveguide and the grating couplers may be transparent to visible light such that the user can view the ambient environment through the waveguide display. In some cases, a fraction of the display light may be coupled out of and propagate away from the waveguide, for example, by the grating couplers or at the interface between the waveguide and air, towards the ambient environment (e.g., in front of the user and the waveguide) rather than to the user's eye. Thus, the displayed content may be leaked out of the waveguide display system and may be viewable by viewers other than the user of the waveguide display system, which may cause aesthetic, interference, privacy, and/or security issues.

According to certain embodiments, a grating coupler with a gradient refractive index in the vertical direction (perpendicular to the waveguide) may be used to reduce the leakage of the display light into the ambient environment. For example, the grating may include multiple grating layers of materials with different refractive indices. The multiple grating layers may be characterized by a refractive index modulation that first increases and then decreases as the distance of the grating layer from the waveguide increases. The multiple grating layers may have certain thickness profiles in order to reduce the display light leakage and serve other purposes. In some embodiments, at least some of the layers may each have a non-uniform thickness profile. In some embodiments, the grating couplers may include surface-relief gratings with varying etch depths, duty cycles, and/or grating periods. The surface-relief gratings may include slanted surface-relief gratings.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
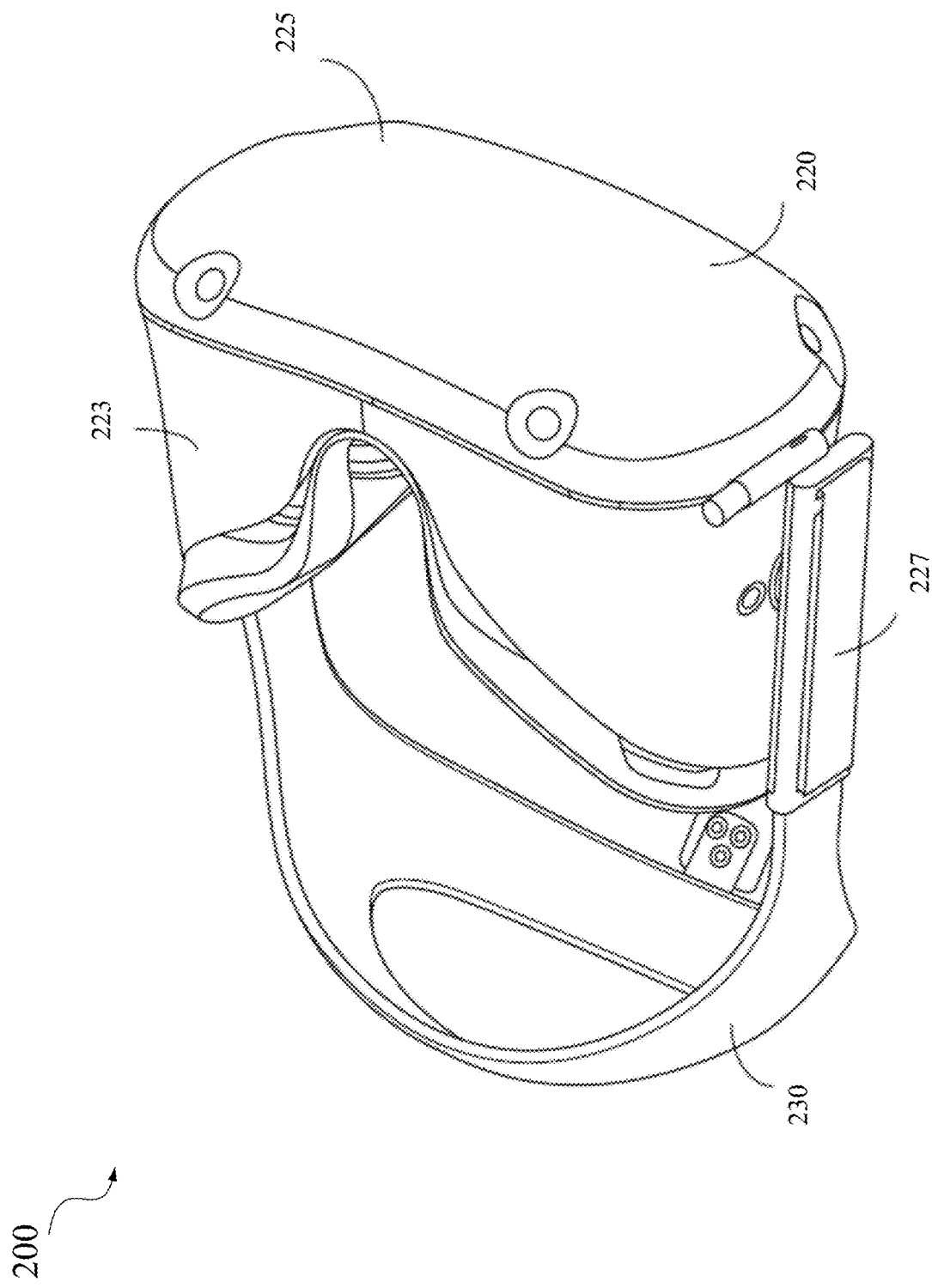
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
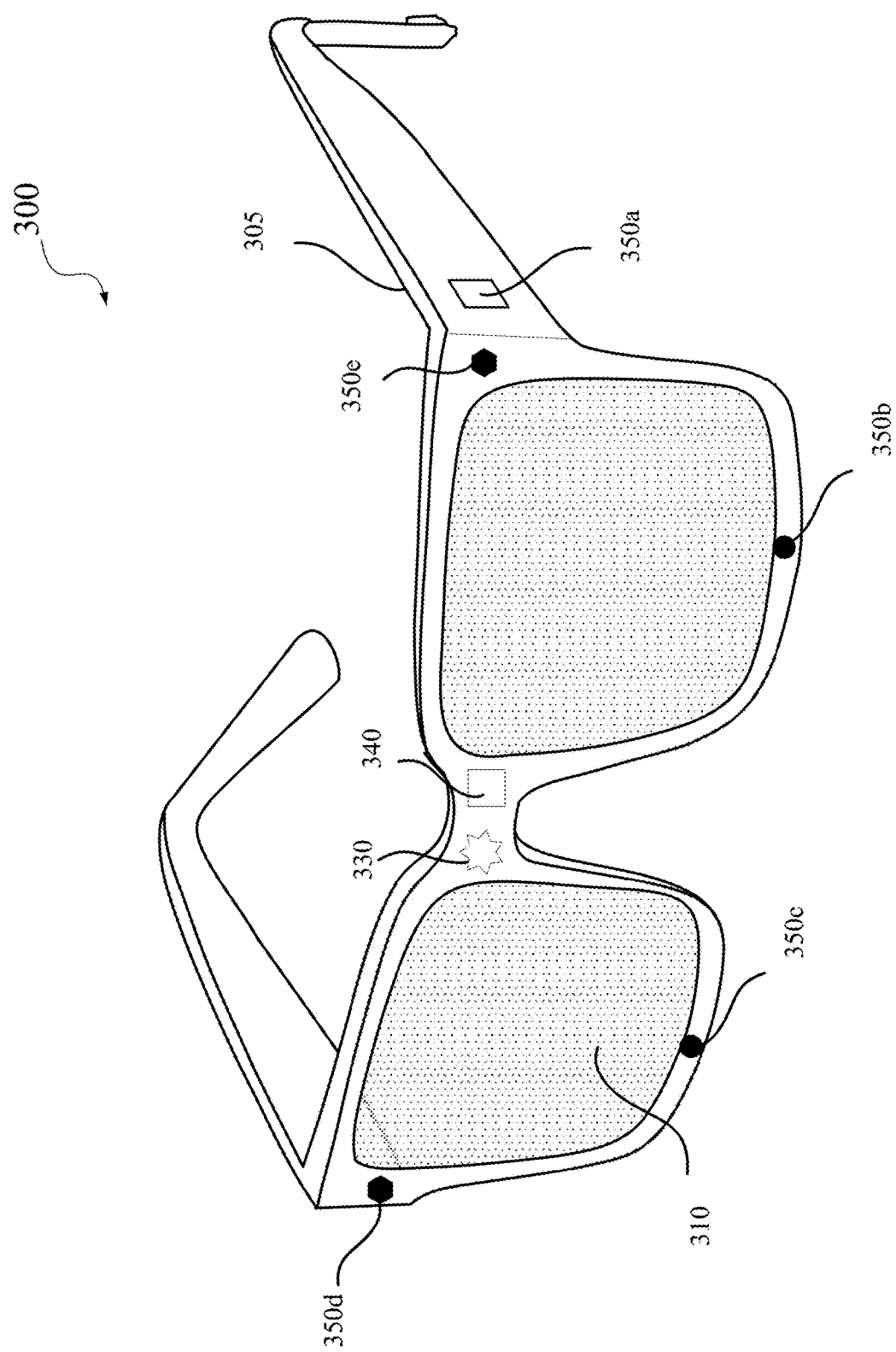
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display.

Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
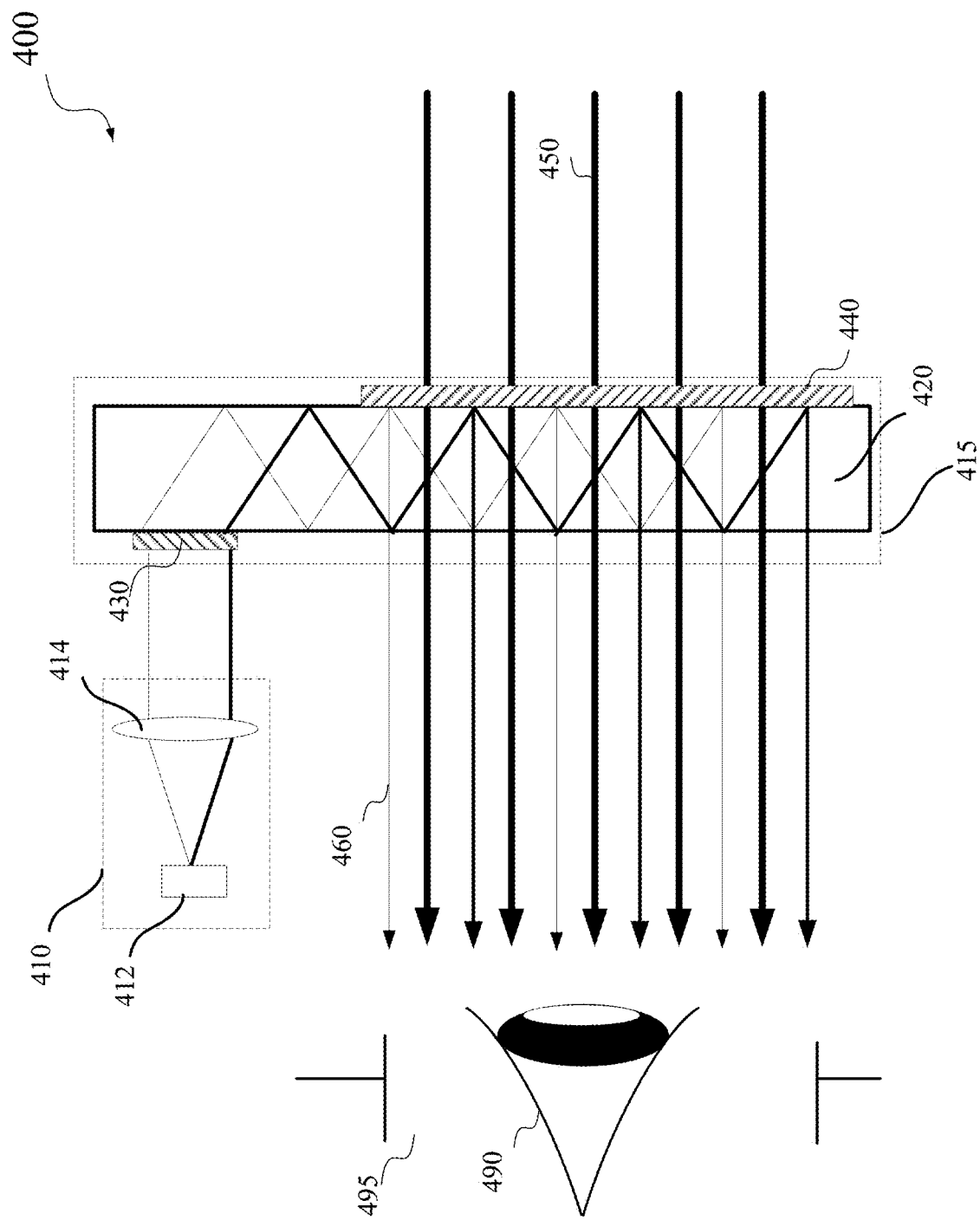
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415.

Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5:
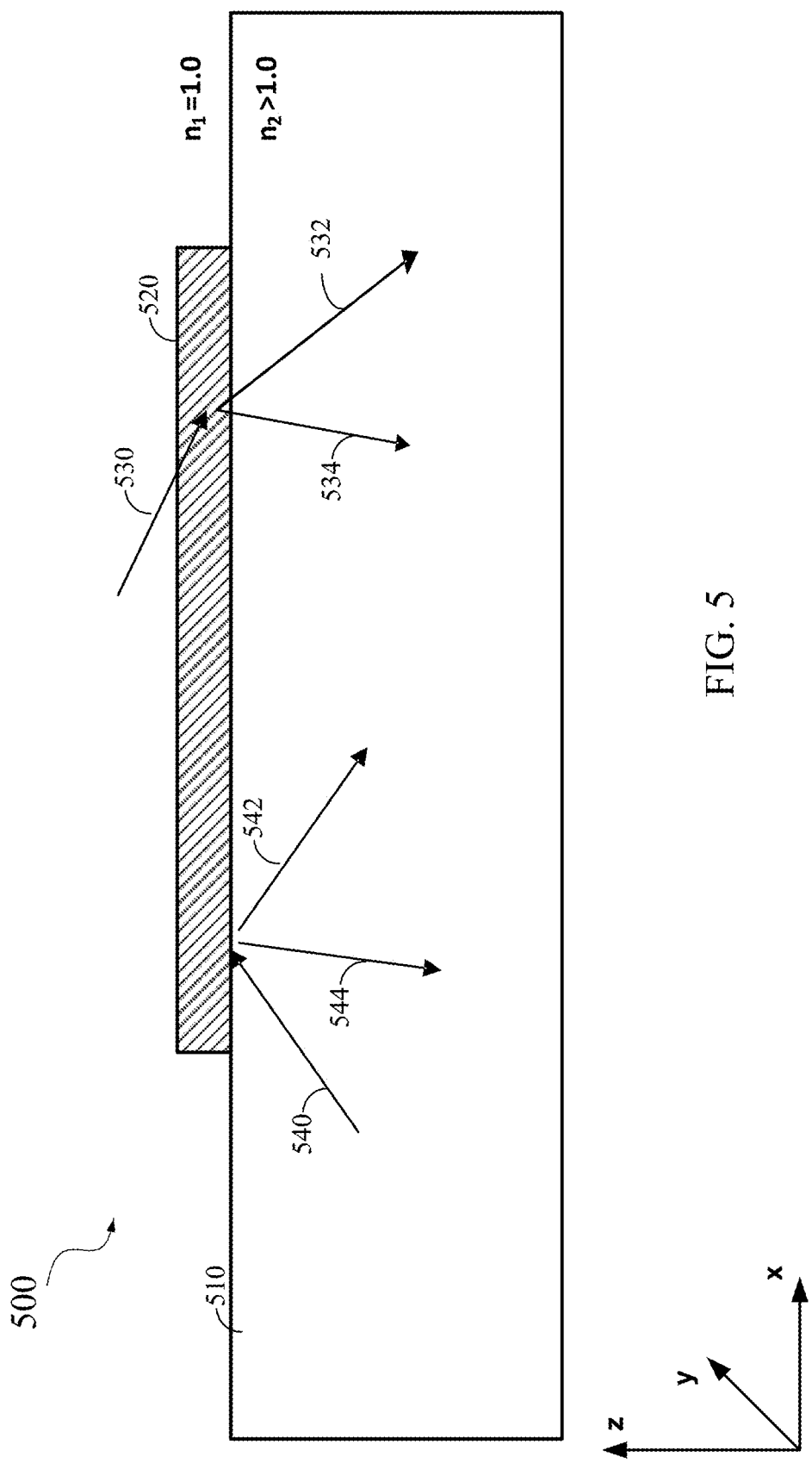
FIG. 5 illustrates propagations of display light and external light in an example of a waveguide display.

FIG. 5 illustrates propagations of display light 540 and external light 530 in an example waveguide display 500 including a waveguide 510 and a grating coupler 520. Waveguide 510 may be a flat or curved transparent substrate with a refractive index $n_2$ greater than the free space refractive index $n_1$ (e.g., 1.0). Grating coupler 520 may be, for example, a Bragg grating or a surface-relief grating.

Display light 540 may be coupled into waveguide 510 by, for example, input coupler 430 of FIG. 4 or other couplers (e.g., a prism or slanted surface) described above. Display light 540 may propagate within waveguide 510 through, for example, total internal reflection. When display light 540 reaches grating coupler 520, display light 540 may be diffracted by grating coupler 520 into, for example, a $0^{th}$ order diffraction (i.e., reflection) light 542 and a −1st order diffraction light 544. The $0^{th}$ order diffraction may propagate within waveguide 510, and may be reflected by the bottom surface of waveguide 510 towards grating coupler 520 at a different location. The −1st order diffraction light 544 may be coupled (e.g., refracted) out of waveguide 510 towards the user's eye, because a total internal reflection condition may not be met at the bottom surface of waveguide 510 due to the diffraction angle.

External light 530 may also be diffracted by grating coupler 520 into, for example, a 0th order diffraction light 532 and a −1st order diffraction light 534. Both the $0^{th}$ order diffraction light 532 and the −1st order diffraction light 534 may be refracted out of waveguide 510 towards the user's eye. Thus, grating coupler 520 may act as an input coupler for coupling external light 530 into waveguide 510, and may also act as an output coupler for coupling display light 540 out of waveguide 510. As such, grating coupler 520 may act as a combiner for combining external light 530 and display light 540. In general, the diffraction efficiency of grating coupler 520 (e.g., a surface-relief grating coupler) for external light 530 (i.e., transmissive diffraction) and the diffraction efficiency of grating coupler 520 for display light 540 (i.e., reflective diffraction) may be similar or comparable.

In order to diffract light at a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
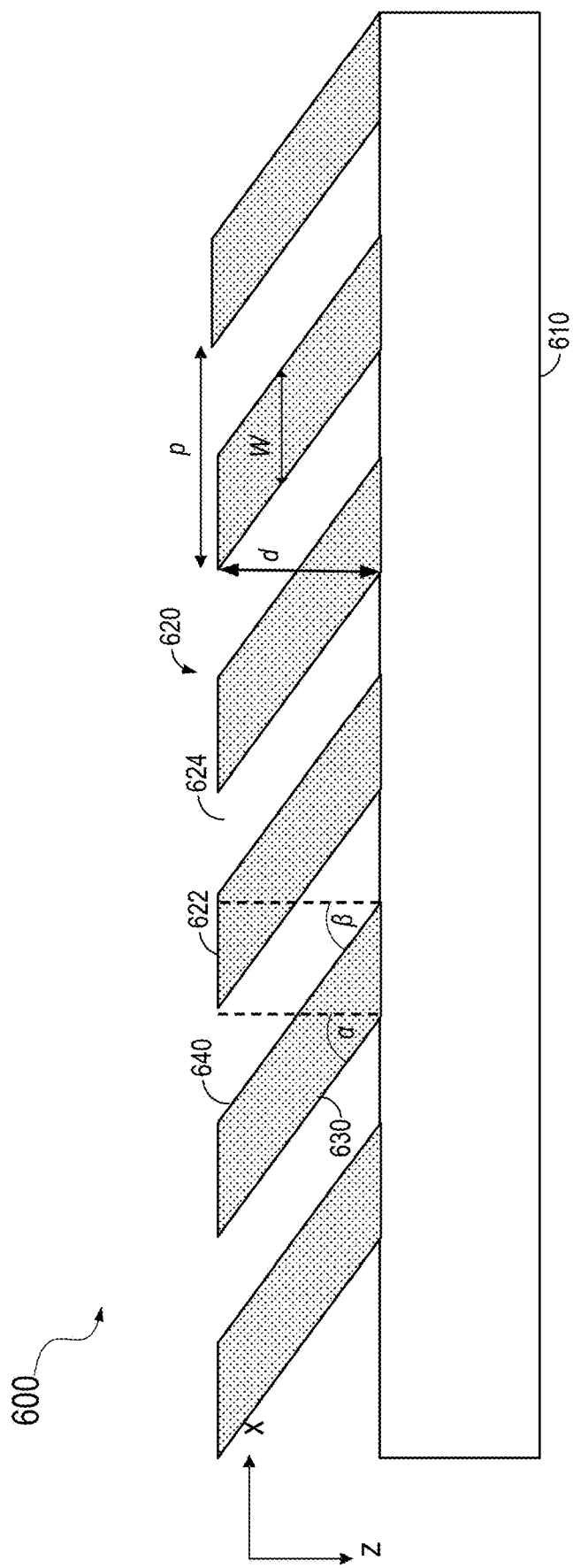
FIG. 6 illustrates an example of a slanted grating coupler in a waveguide display according to certain embodiments.

FIG. 6 illustrates an example of a slanted grating 620 in a waveguide display 600 according to certain embodiments. Slanted grating 620 may be an example of input coupler 430, output couplers 440, or grating coupler 520. Waveguide display 600 may include slanted grating 620 on a waveguide 610, such as substrate 420 or waveguide 510. Slanted grating 620 may act as a grating coupler for couple light into or out of waveguide 610. In some embodiments, slanted grating 620 may include a one-dimensional periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, $HfO_x$, etc.). Each ridge 622 may include a leading edge 630 with a slant angel α and a trailing edge 640 with a slant angle β. In some embodiments, leading edge 630 and training edge 640 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle β may be less than 20%, 10%, 5%, 1%, or less. In some embodiments, slant angle α and slant angle β may range from, for example, about 30° or less to about 70% or larger.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The user experience with an artificial reality system may depend on several optical characteristics of the artificial reality system, such as the field of view (FOV), image quality (e.g., resolution), size of the eye box of the system (to accommodate for eye and/or head movement), the distance of eye relief, optical bandwidth, and brightness of the displayed image. In general, the FOV and the eye box need to be as large as possible, the optical bandwidth needs to cover the visible band, and the brightness of the displayed image needs to be high enough (especially for optical see-through AR systems).

In a waveguide-based near-eye display, the output area of the display may be much larger than the size of the eyebox of the near-eye display system. The portion of light that may reach a user's eyes may depend on the ratio between the size of the eyebox and the output area of the display, which, in some cases, may be less than 10% for a certain eye relief and field of view. In order to achieve a desired brightness of the displayed image perceived by user's eyes, the display light from the projector or the light source may need to be increased significantly, which may increase the power consumption and cause some safety concerns.

Figure 7B:
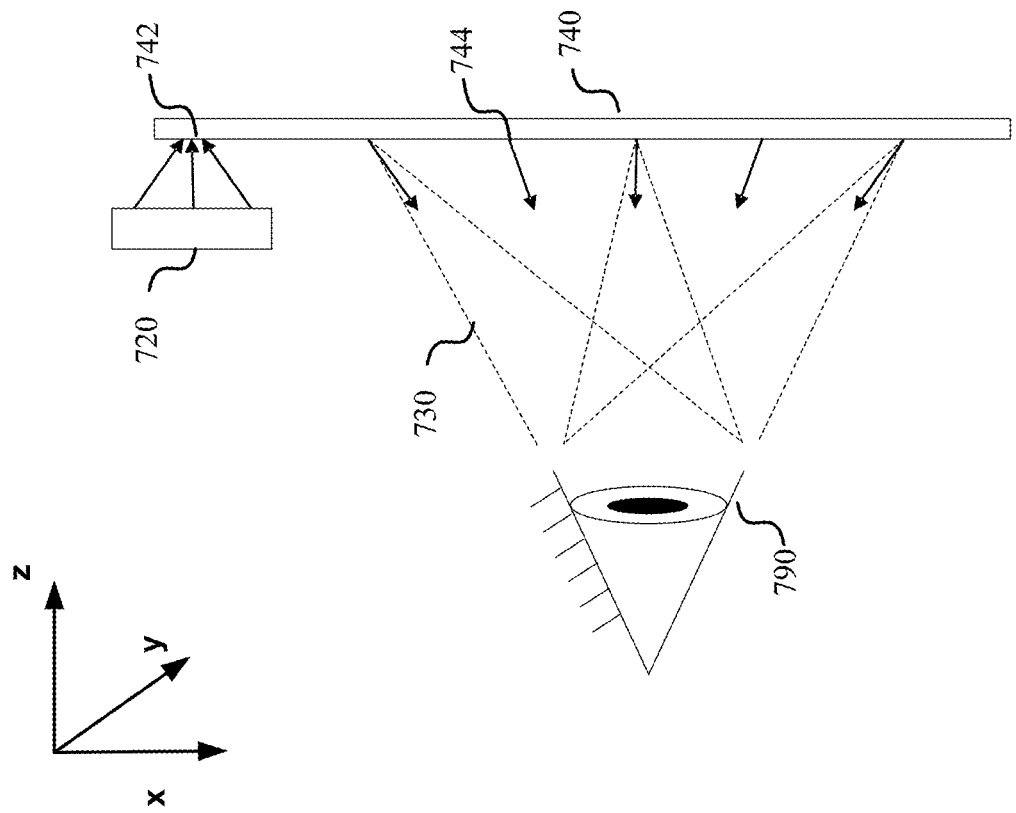
FIG. 7B illustrates an example of a waveguide-based near-eye display where display light may be coupled out of a waveguide display at different angles in different regions of the waveguide display according to certain embodiments.
Figure 7A:
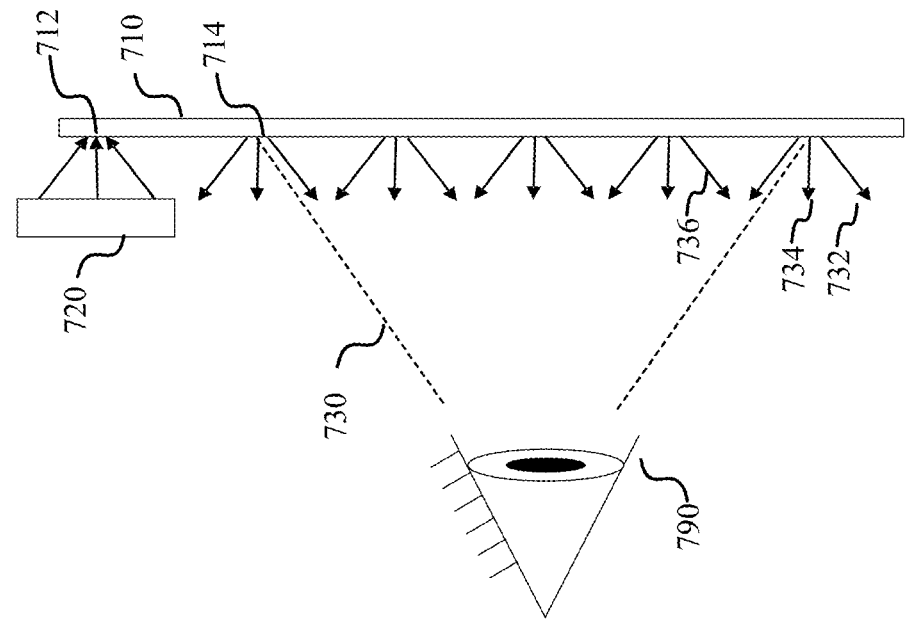
FIG. 7A illustrates an example of a waveguide-based near-eye display where display light for all fields of view is substantially uniformly output from different regions of a waveguide display.

FIG. 7A illustrates an example of a waveguide-based near-eye display where display light for all fields of view is substantially uniformly output from different regions of a waveguide display 710. The near-eye display may include a projector 720 and waveguide display 710. Projector 720 may be similar to projector 410 and may include a light source or image source similar to light source or image source 412 and projector optics similar to projector optics 414. Waveguide display 710 may include a waveguide (e.g., a substrate), one or more input couplers 712, and one or more output couplers 714. Input couplers 712 may be configured to couple display light from different fields of view (or viewing angles) into the waveguide, and output couplers 714 may be configured to couple display light out of the waveguide. The input and output couplers may include, for example, slanted surface-relief gratings or volume Bragg gratings. In the example shown in FIG. 7, output coupler 714 may have similar grating parameters across the full region of the output coupler other than parameters that may be varied to adjust the coupling efficiency for more uniform output light. Thus, the display light may be partially coupled out of the waveguide at different regions of waveguide display 710 in a similar manner as shown in FIG. 7A, where display light from all fields of view of the near-eye display may be partially coupled out of the waveguide at any given region of waveguide display 710.

As also shown in FIG. 7A, the near-eye display system may have an eyebox at a certain eyebox position 790 and having a limited size and thus a limited field of view 730. As such, not all light coupled out of the waveguide in waveguide display 710 may reach the eyebox at eyebox position 790. For example, display light 732, 734, and 736 from waveguide display 710 may not reach the eyebox at eyebox position 790, and thus may not be received by the user's eyes, which may result in significant loss of the optical power from projector 720.

In certain embodiments, an optical coupler (e.g., a slanted surface-relief grating) for a waveguide-based display may include a grating coupler that includes multiple regions (or multiple multiplexed grating), where different regions of the grating coupler may have different angular selectivity characteristics (e.g., constructive interference conditions) for the incident display light such that, at any region of the waveguide-based display, diffraction light that would not eventually reach user's eyes may be suppressed (i.e., may not be diffracted by the grating coupler so as to be coupled into or out of the waveguide and thus may continue to propagate within the waveguide), while light that may eventually reach the user's eyes may be diffracted by the grating coupler and be coupled into or out of the waveguide.

FIG. 7B illustrates an example of a waveguide-based near-eye display where display light may be coupled out of a waveguide display 740 at different angles in different regions of the waveguide display according to certain embodiments. Waveguide display 740 may include a waveguide (e.g., a substrate), one or more input couplers 742, and one or more output couplers 744. Input couplers 742 may be configured to couple display light from different fields of view (e.g., viewing angles) into the waveguide, and output couplers 744 may be configured to couple display light out of the waveguide. The input and output couplers may include, for example, slanted surface-relief gratings or other types of gratings or reflectors. The output couplers may have different grating parameters and thus different angular selectivity characteristics at different regions of the output couplers. Thus, at each region of the output couplers, only display light that would propagate in a certain angular range towards the eyebox at eyebox position 790 of the near-eye display may be coupled out of the waveguide, while other display light may not meet the angular selectivity condition at the region and thus may not be coupled out of the waveguide. In some embodiments, the input couplers may also have different grating parameters and thus different angular selectivity characteristics at different regions of the input couplers, and thus, at each region of an input coupler, only display light from a respective field of view may be coupled into the waveguide. As a result, most of the display light coupled into the waveguide and propagating in the waveguide can be efficiently sent to the eyebox, thus improving the power efficiency of the waveguide-based near-eye display system.

The refractive index modulation of a slanted surface-relief grating, and other parameters of the slanted surface-relief grating, such as the grating period, the slant angle, the duty cycle, the depth, and the like, may be configured to selectively diffract incident light within a certain incident angular range (e.g., FOV) and/or a certain wavelength band at certain diffraction directions (e.g., within an angular range shown by field of view 730). For example, when the refractive index modulation is large (e.g., >0.2), a large angular bandwidth (e.g., >10°) may be achieved at the output couplers to provide a sufficiently large eyebox for the waveguide-based near-eye display system.

Figure 8A:
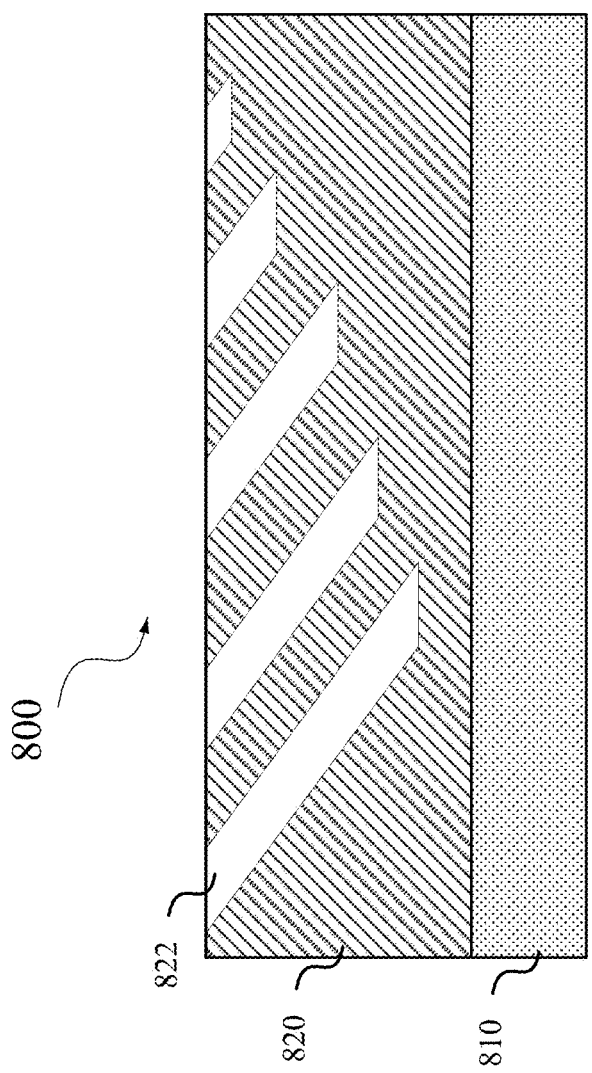
FIG. 8A illustrates an example of a slanted grating with variable etch depths according to certain embodiments.

FIG. 8A illustrates an example of a slanted grating 800 with variable etch depths according to certain embodiments. Slanted grating 800 may include a substrate 810 (e.g., a glass substrate) and a grating layer 820 (e.g., a dielectric or polymer layer) formed on substrate 810. A plurality of grating grooves 822 may be etched or otherwise formed (e.g., imprinted) in grating layer 820. Grating grooves 822 may have non-uniform depths, widths, and/or separations. As such, slanted grating 800 may have variable grating periods, depths, and/or duty cycles.

The slanted surface-relief gratings with parameters and configurations (e.g., duty cycles, depths, or refractive index modulations) varying over the regions of the gratings described above and other surface-relief gratings (e.g., gratings used for eye-tracking) may be fabricated using many different nanofabrication techniques. The nanofabrication techniques generally include a patterning process and a post-patterning (e.g., over-coating) process. The patterning process may be used to form slanted ridges or grooves of the slanted grating. There may be many different nanofabrication techniques for forming the slanted ridges. For example, in some implementations, the slanted grating may be fabricated using lithography techniques including slanted etching. In some implementations, the slanted grating may be fabricated using nanoimprint lithography (NIL) molding techniques, where a master mold including slanted structures may be fabricated using, for example, slanted etching techniques, and may then be used to mold slanted gratings or different generations of soft stamps for nanoimprinting. The post-patterning process may be used to over-coat the slanted ridges and/or to fill the gaps between the slanted ridges with a material having a different refractive index than the slanted ridges. The post-patterning process may be independent from the patterning process. Thus, a same post-patterning process may be used on slanted gratings fabricated using any patterning technique.

Techniques and processes for fabricating slanted gratings described herein are for illustration purposes only and are not intended to be limiting. A person skilled in the art would understand that various modifications may be made to the techniques described below. For example, in some implementations, some operations described below may be omitted. In some implementations, additional operations may be performed to fabricate the slanted grating. Techniques disclosed herein may also be used to fabricate other slanted structures on various materials.

Figure 8B:
FIG. 8B illustrates an example of a fabricated slanted grating with variable etch depths according to certain embodiments.

FIG. 8B illustrates an example of a fabricated slanted grating 805 with variable etch depths according to certain embodiments. In the example shown in FIG. 8B, slanted grating 805 may be etched in an oxide layer 830, which may have a refractive index, for example, between about 1.46 and about 2.4. As illustrated, slanted grating 805 may have different etch depths and duty cycles at different regions. The grating period may also be different at the different regions. As such, different regions of slanted grating 805 may have different desire diffraction characteristics as described above with respect to, for example, FIG. 7B.

Figures 9A, 9B:
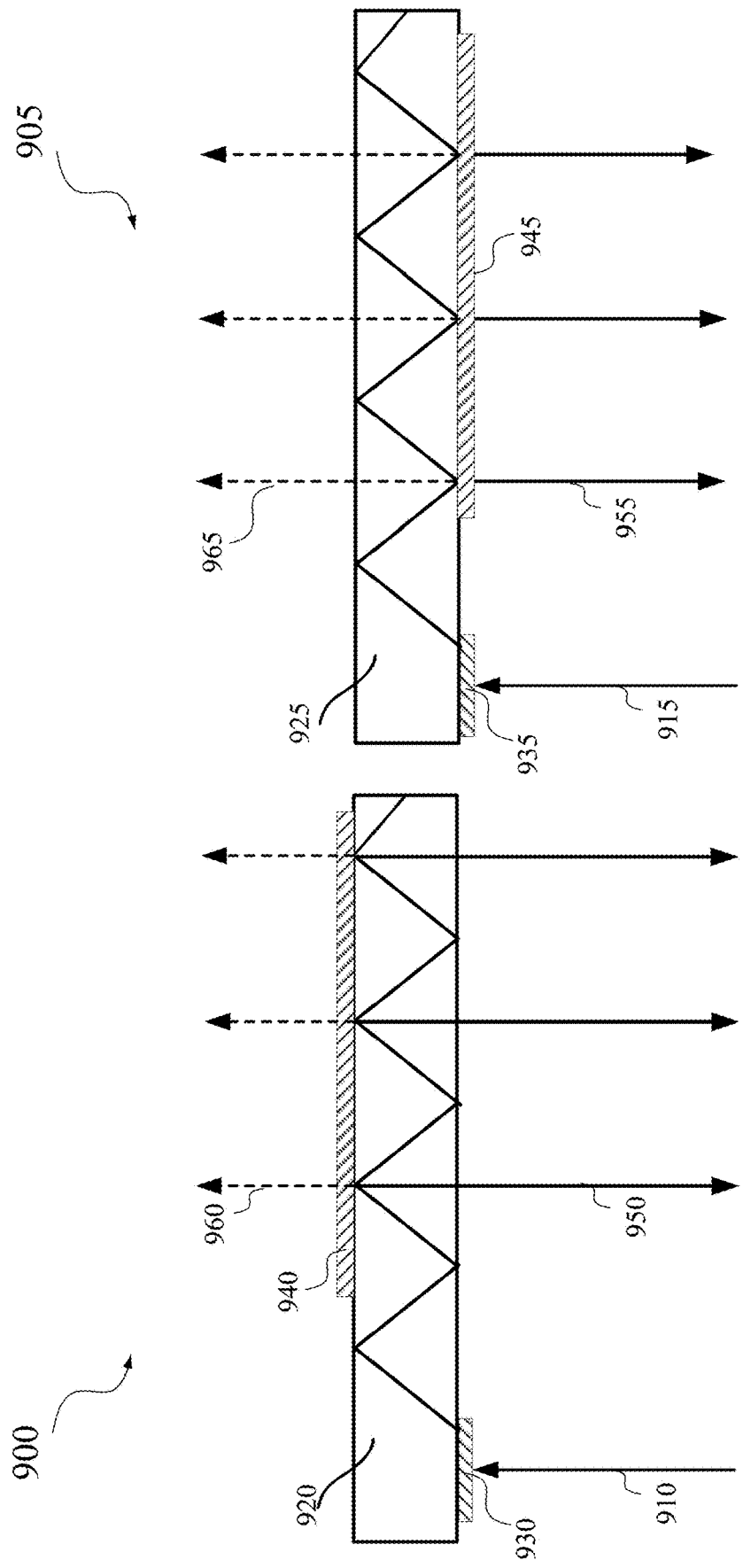
FIG. 9A illustrates an example of leakage of display light in a waveguide display.
FIG. 9B illustrates another example of leakage of display light in a waveguide display.

FIG. 9A illustrates an example of leakage of display light in a waveguide display 900. Waveguide display 900 may be an example of optical see-through augmented reality system 400. Waveguide display 900 may include a substrate 920, an input coupler 930, and an output coupler 940, which may be similar to substrate 420, input coupler 430, and output coupler 440, respectively. As illustrated, display light 910 may be coupled into substrate 920 by input coupler 930 such that the coupled-in display light may propagate within substrate 920 through total internal reflection. As the display light reaches a surface of substrate 920 where output coupler 940 is formed, a portion of the display light may be reflectively diffracted such that the portion of the display light may be coupled out of substrate 920 towards user's eyes as illustrated by a light beam 950. A portion of the display light entering output coupler 940 may not be reflectively diffracted or may be transmissively diffracted by output coupler 940, and thus may be coupled out of the substrate towards the front of waveguide display 900 (e.g., in the z direction) as shown by a light beam 960. Light beam 960 may be visible to viewers in front of waveguide display 900. Thus, viewers in front of waveguide display 900 may be able to view the displayed images, which may be undesirable in many circumstances.

FIG. 9B illustrates another example of leakage of display light in a waveguide display 905. Waveguide display 905 may be another example of optical see-through augmented reality system 400. Waveguide display 905 may include a substrate 925, an input coupler 935, and an output coupler 945. As illustrated, display light 915 may be coupled into substrate 925 by input coupler 935 such that the coupled-in display light may propagate within substrate 925 through total internal reflection. As the display light reaches a surface of substrate 925 where output coupler 945 is formed, a portion of the display light may be transmissively diffracted such that the portion of the display light may be coupled out of substrate 925 towards user's eyes as illustrated by a light beam 955. A portion of the display light entering output coupler 945 may be reflectively diffracted by output coupler 945, and thus may be coupled out of the substrate towards the front of waveguide display 905 (e.g., in the z direction) as shown by a light beam 965. Light beam 965 may be visible to viewers in front of waveguide display 905. Thus, viewers in front of waveguide display 905 may be able to view the displayed images, which may be undesirable in many circumstances.

Figure 10A:
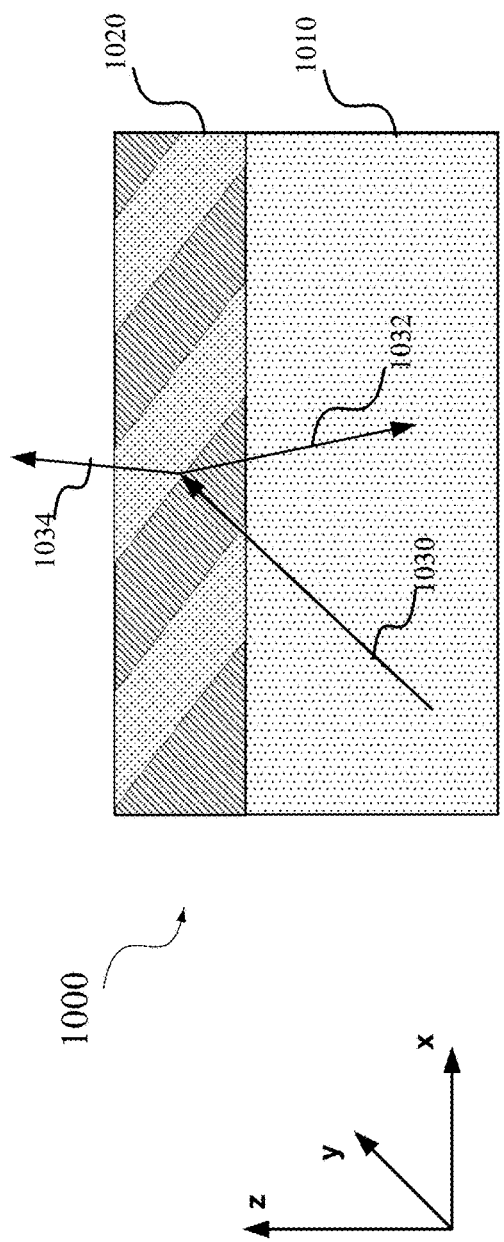
FIG. 10A illustrates an example of leakage of display light in a waveguide display.

FIG. 10A illustrates an example of leakage of display light in a waveguide display 1000. Waveguide display 1000 may be another example of optical see-through augmented reality system 400. Waveguide display 1000 may include a substrate 1010 and a grating coupler 1020, which may be similar to substrate 420 and output coupler 440, respectively. In the illustrated example, grating coupler 1020 may have a refractive index modulation of about 0.2. For example, the grating ridges may have refractive index about 2, while the grating grooves may be filled with a material having a refractive index about 1.8. As illustrated, a light beam 1030 may propagate within substrate 1010, for example, through total internal reflection. A large portion of light beam 1030 may be reflectively diffracted by grating coupler 1020 towards user's eyes as shown by a light beam 1032, while a small portion of light beam 1030 may be transmissively diffracted by grating coupler 1020 towards the front of waveguide display 1000 as shown by a light beam 1034.

Figure 10C:
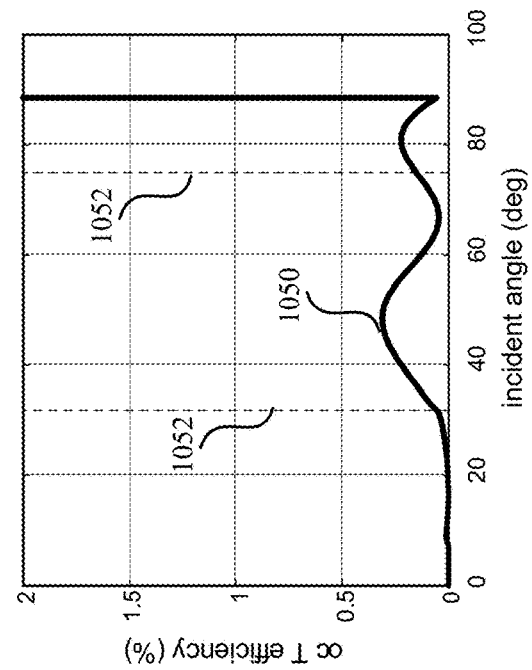
FIG. 10C includes a diagram illustrating the outcoupling efficiency by the transmissive diffraction of the grating coupler of FIG. 10A as a function of the angle of incidence.
Figure 10B:
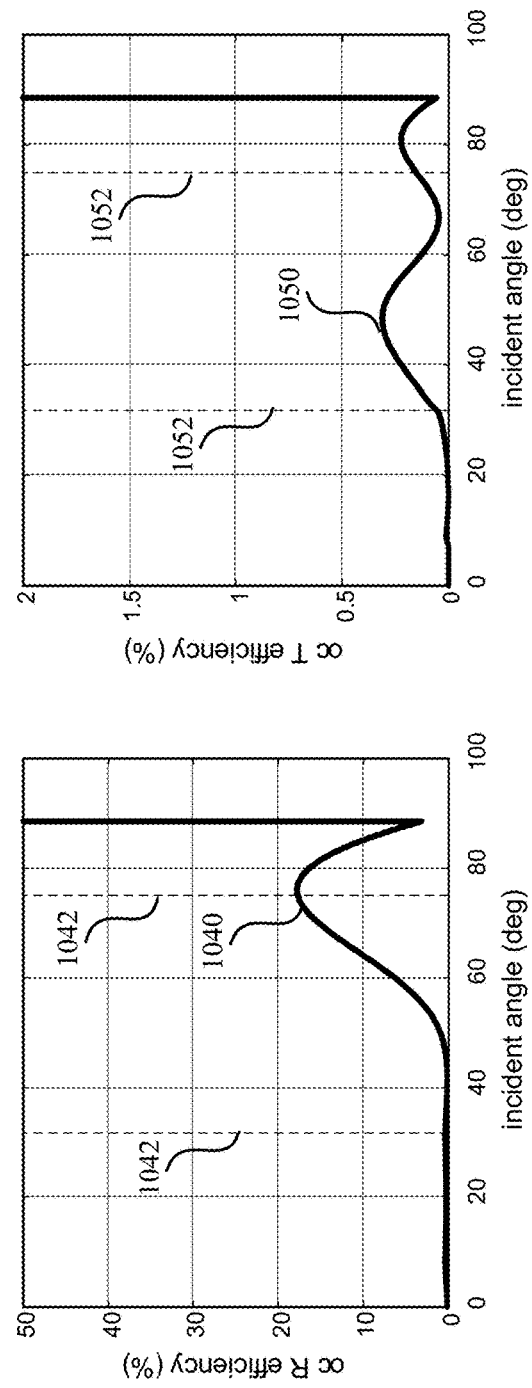
FIG. 10B includes a diagram illustrating the outcoupling efficiency by the reflective diffraction of the grating coupler of FIG. 10A as a function of the angle of incidence.

FIG. 10B is a diagram including a curve 1040 illustrating the outcoupling efficiency by the reflective diffraction of grating coupler 1020 as a function of the angle of incidence. In FIG. 10B, dashed lines 1042 show the angular range of display light of interest (e.g., display light that may be guided by substrate 1010). Curve 1040 shows that the outcoupling efficiency by the reflective diffraction of grating coupler 1020 may reach about 20% at certain angles of incidence. In some embodiments, grating coupler 1020 may be tuned to achieve an outcoupling efficiency by the reflective diffraction close to about 50%.

FIG. 10C is a diagram including a curve 1050 illustrating the outcoupling efficiency by the transmissive diffraction of grating coupler 1020 as a function of the angle of incidence. In FIG. 10C, dashed lines 1052 show the angular range of display light of interest (e.g., display light that may be guided by substrate 1010). Curve 1050 shows that the undesired outcoupling efficiency by the transmissive diffraction of grating coupler 1020 may reach about 0.3% or higher at certain angles of incidence. At this outcoupling efficiency, the undesired outcoupled display light may be observed by viewer in front of waveguide display. It is generally desirable that the undesired outcoupling of display light by the transmissive diffraction be less than 0.1%.

Figure 11A:
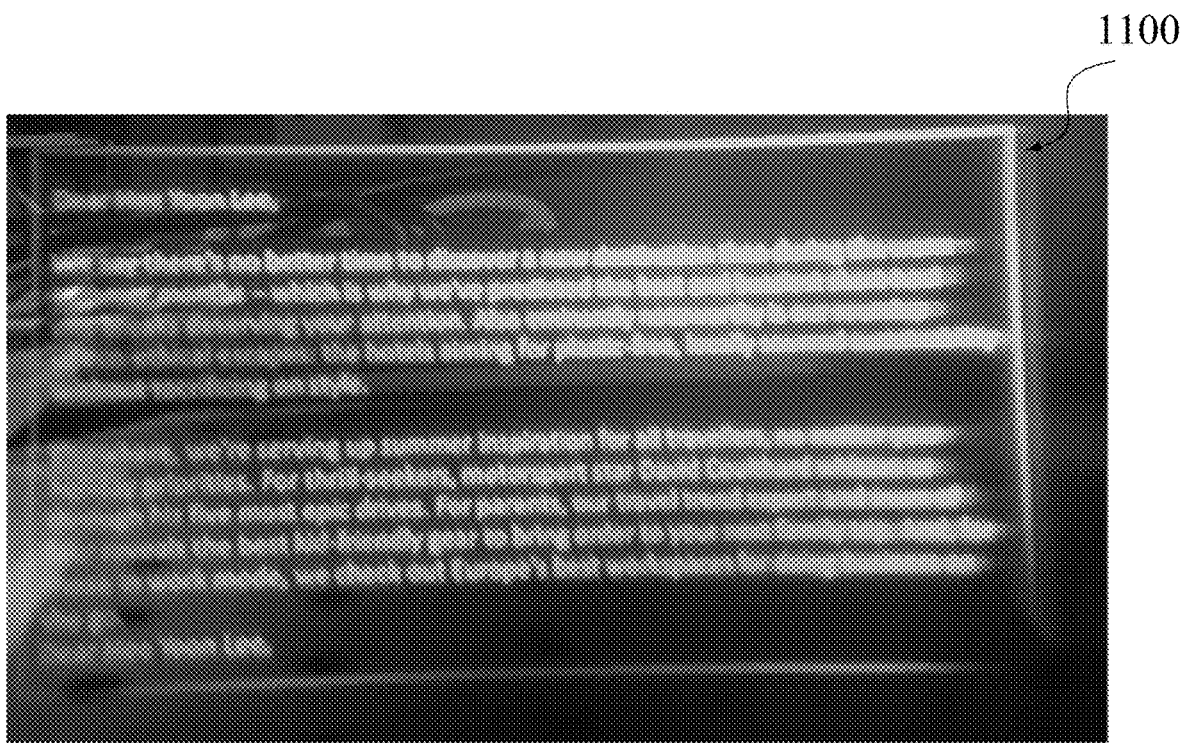
FIG. 11A illustrates an example of an image displayed to a user of a waveguide display.

FIG. 11A illustrates an example of an image 1100 displayed to a user of a waveguide display. Image 1100 may be viewed from the user side and may be superimposed on the view of the ambient environment. As illustrated, image 1100 may have a relatively high intensity and thus may be viewed by the user even if the light intensity of the ambient environment is high.

Figure 11B:
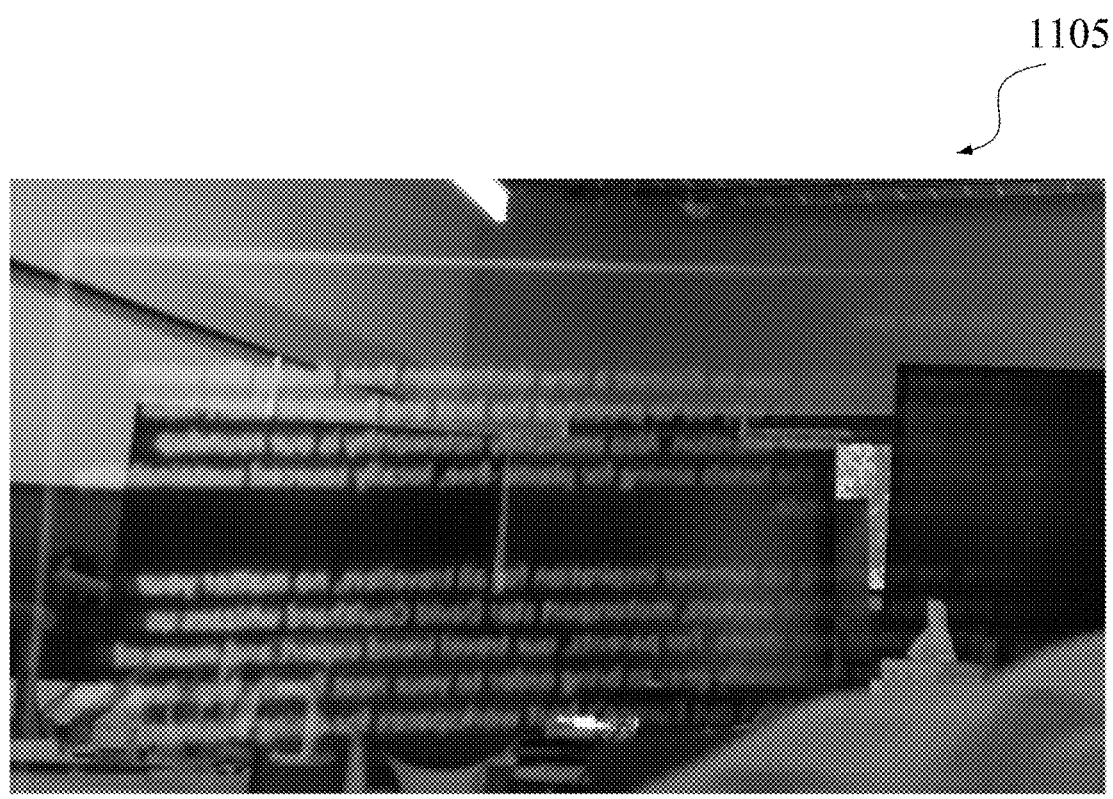
FIG. 11B illustrates an example of a displayed image that can be viewed from the front of the waveguide display due to leakage.

FIG. 11B illustrates an example of an image 1105 that can be viewed from the front of the waveguide display due to leakage. Image 1105 may be a mirrored and lighter version of image 1100 due to the opposite viewing direction and the lower coupling efficiency. However, image 1105 may still be viewable by viewers other than the user of the waveguide display. In the example shown in FIG. 11B, the leaked portion of the display light may be about 15% of the display light coupled into the waveguide. As such, various aesthetic, privacy, security, and interference issues may arise.

According to certain embodiments, the leakage of the display light may be reduced using a grating coupler characterized by a gradient refractive index or including multiple layers with different (e.g., increasing or decreasing) refractive indices. In some embodiments, each of the multiple layers may have a respective thickness profile. The grating coupler with the gradient refractive index may also help to reduce scattering artifacts and reflections at the interfaces between layers of different materials due to a smaller difference in the refractive indices.

FIG. 12A illustrates an example of a grating coupler 1200 with a refractive index gradient for a waveguide display according to certain embodiments. Grating coupler 1200 may include multiple grating layers, such as grating layers 1220, 1230, and 1240, formed on a substrate 1210 (e.g., a glass substrate). Even though three grating layers are shown in the example, the multiple grating layers may include two or more layers, such as four or more layers. The multiple grating layers may have the same or different thicknesses. The multiple grating layers may be characterized by different refractive indices. A plurality of grating grooves 1250 may be etched in the multiple grating layers and may be coated with an overcoat layer as described above. In the example shown in FIG. 12A, substrate 1210 may be used as the etch stop, and thus grating grooves 1250 may have the same depth. The etching may be slanted etching, such that grating grooves 1250 may be slanted to form a slanted grating.

Grating layer 1230 may have a higher refractive index than grating layer 1220 and grating layer 1240. Grating layer 1230 may also have a refractive index greater than the refractive index of substrate 1210. In one example, substrate 1210 may have a refractive index between about 1.9 and about 2.0, grating layer 1220 may have a refractive index about 1.9, grating layer 1230 may have a refractive index about 2.0, grating layer 1240 may have a refractive index about 1.9, while the overcoat layer that fills grating grooves 1250 may have a refractive index about 1.8. Thus, the refractive index modulation in grating layers 1220, 1230, and 1240 may be about 0.1, 0.2, and 0.1, respectively. In examples where there may be four or more grating layers, the grating layer(s) in the middle of the stack may have a higher refractive index or a higher refractive index modulation than grating layers below or above, the refractive indexes or refractive index modulations of which may or may not be symmetrical with respect to the grating layer(s) in the middle of the stack.

The thicknesses and/or the refractive indices of grating layers 1220, 1230, and 1240 may be selected such that the portion of the display light that is coupled out of the waveguide to the ambient environment rather than to the user of the display system may be reduced or minimized, such as less than about 1.0% or less than about 0.5%. For example, the thicknesses and/or the refractive indices of the grating layers may be selected such that the transmissive diffraction or refraction by grating coupler 1200 (used as a reflective grating) may be reduced or minimized. In one example, the thickness of grating layer 1230 may be greater than the thickness of grating layer 1220 and the thickness of grating layer 1240, such as about twice of the thickness of grating layer 1220 or the thickness of grating layer 1240. In one example, the thickness of grating layer 1220 or 1240 may be between about 75 nm and about 85 nm, whereas the thickness of grating layer 1230 may be between about 150 nm and about 170 nm.

FIG. 12B is a diagram including a curve 1260 illustrating the outcoupling efficiency by the reflective diffraction of grating coupler 1200 as a function of the angle of incidence. In the example shown in FIG. 12B, grating layer 1230 may have a refractive index about 2.0, grating layers 1220 and 1240 may have a refractive index about 1.9, while the overcoat layer that fills grating grooves 1250 may have a refractive index about 1.8. Thus, the refractive index modulation in grating layers 1220, 1230, and 1240 may be about 0.1, 0.2, and 0.1, respectively. In FIG. 10B, dashed lines 1262 show the angular range of display light of interest (e.g., display light that may be guided by substrate 1210). Curve 1260 shows that the outcoupling efficiency by the reflective diffraction of grating coupler 1200 may be over 10% at certain angles of incidence.

FIG. 12C is a diagram including a curve 1270 illustrating the outcoupling efficiency by the transmissive diffraction of grating coupler 1200 as a function of the angle of incidence. The example of grating coupler 1200 shown in FIG. 12C may be the same as the example of grating coupler 1200 shown in FIG. 12B. In FIG. 12C, dashed lines 1272 show the angular range of display light of interest (e.g., display light that may be guided by substrate 1210). Curve 1270 shows that the undesired outcoupling efficiency by the transmissive diffraction of grating coupler 1200 may be close to zero (<<0.1%) in the angular range of the display light of interest. Thus, the undesired outcoupling efficiency is significantly reduced compared with the example shown in FIG. 10C.

Figure 13A:
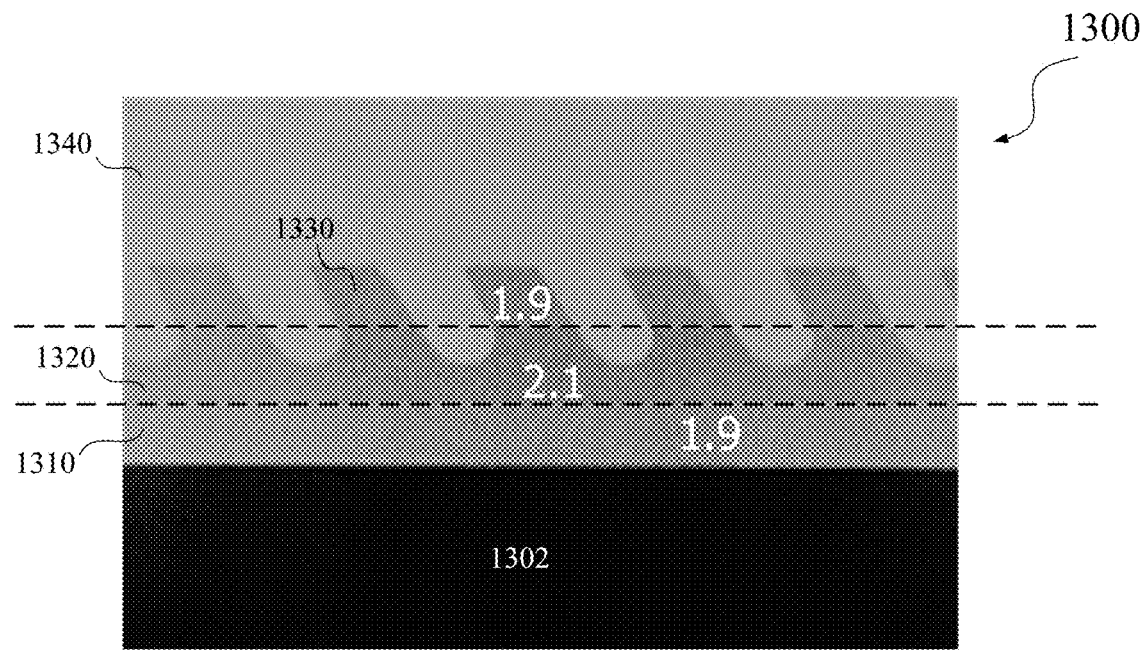
FIG. 13A illustrates a region of an example of a fabricated grating coupler with a gradient refractive index and a variable grating depth for a waveguide display according to certain embodiments.

FIG. 13A illustrates a first region 1300 of an example of a fabricated grating with a refractive index gradient and a variable grating depth for a waveguide display according to certain embodiments. The example of the fabricated grating shown in FIG. 13A may include a first grating layer 1310, a second grating layer 1320, a third grating layer 1330, and an overcoat layer 1340. The grating layers may be formed on a substrate 1302. First grating layer 1310 may include an oxide that has a refractive index about 1.9. Second grating layer 1320 may include, for example, SiN, which may have a refractive index about 2.0 or 2.1. Third grating layer 1330 may include an oxide that has a refractive index about 1.9. Overcoat layer 1340 may include an oxide that has a lower refractive index, such as between about 1.45 and 1.8. In first region 1300, the etch depth may be lower. For example, the etched grating grooves may be in grating layers 1320 and 1330 only, where grating layer 1310 may have not been etched.

Figure 13B:
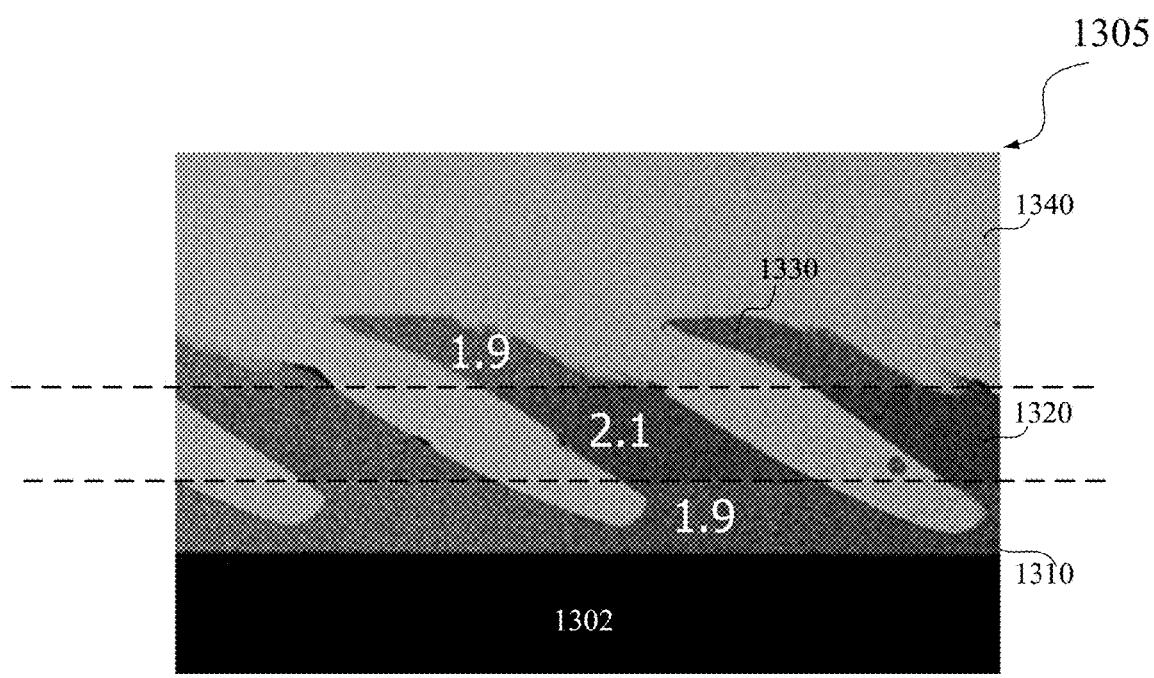
FIG. 13B illustrates another region of the example of the fabricated grating coupler with the gradient refractive index and the variable grating depth for the waveguide display according to certain embodiments.

FIG. 13B illustrates a second region 1305 of the example of fabricated grating coupler with the gradient refractive index and variable grating depth for the waveguide display according to certain embodiments. As described above, the example of the fabricated grating shown in FIG. 13B may also include first grating layer 1310, second grating layer 1320, third grating layer 1330, and overcoat layer 1340. As illustrated in the example, in second region 1305, the etch depth may be higher. For example, the etched grating grooves may be in all three grating layers 1310-1330. In some embodiments, the grating may have different respective duty cycles and/or grating periods in first region 1300 and second region 1305.

Figure 14A:
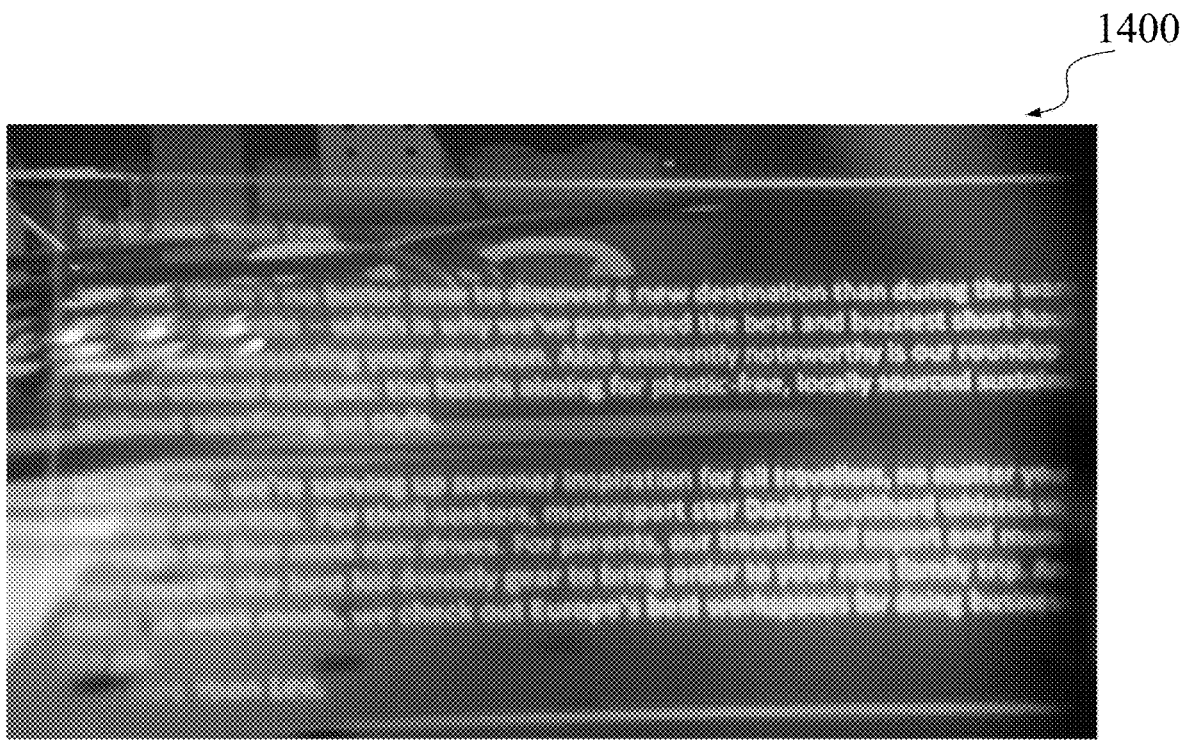
FIG. 14A illustrates an example of an image displayed to a user of a waveguide display that includes a grating coupler with a gradient refractive index according to certain embodiments.

FIG. 14A illustrates an example of an image 1400 displayed to a user of a waveguide display that includes a grating coupler with a refractive index gradient, such as the grating coupler shown in FIGS. 13A-13B, according to certain embodiments. As described above with respect to, for example, FIGS. 13A and 13B, the grating coupler may include multiple grating layers characterized by different refractive indices and may have a variable etch depth. Image 1400 may be viewed from the user side and may be superimposed on the view of the ambient environment. As illustrated, image 1400 may have a relatively high intensity and thus may be viewed by the user even if the light intensity of the ambient environment is high.

Figure 14B:
FIG. 14B illustrates an example of a displayed image viewed from the front of the waveguide display that includes the grating coupler with the gradient refractive index according to certain embodiments.

FIG. 14B illustrates an example of an image 1405 viewed from the front of the waveguide display that includes the grating coupler with the gradient refractive index, such as the grating coupler shown in FIGS. 13A-13B, according to certain embodiments. Image 1405 may be a mirrored and much lighter version of image 1400 due to the opposite viewing direction and the much lower coupling efficiency. In the example shown in FIG. 14B, the leaked portion of the display light may be less than about 1.0%, such as about 0.5% or lower, of the display light coupled into the waveguide. Thus, as shown by FIG. 14B, image 1405 may not be clearly viewable by viewers other than the user of the waveguide display, in particular, when the intensity of the ambient light is high.

FIG. 15A illustrates another example of a grating coupler 1500 with a refractive index gradient for a waveguide display according to certain embodiments. Grating coupler 1500 may include multiple grating layers, such as grating layers 1520, 1530, and 1540, formed on a substrate 1510. Even though three grating layers are shown in the example, the multiple grating layers may include two or more layers, such as four or more layers. The multiple grating layers may have the same or different thicknesses. The multiple grating layers may be characterized by different refractive indices. A plurality of grating grooves 1550 may be etched in the multiple grating layers and may be coated with an overcoat layer as described above. In the example shown in FIG. 15A, substrate 1510 may be used as the etch stop, and thus grating grooves 1550 may have the same depth. The etching may be slanted etching, such that grating grooves 1550 may be slanted to form a slanted grating.

In grating coupler 1500, grating layer 1530 may have a lower refractive index than grating layer 1520 and grating layer 1540. Grating layer 1530 may also have a refractive index lower than the refractive index of substrate 1510. In one example, substrate 1510 may have a refractive index between about 1.65 and about 1.9, grating layer 1520 may have a refractive index about 1.8, grating layer 1530 may have a refractive index about 1.7, grating layer 1540 may have a refractive index about 1.8, while the overcoat layer that fills grating grooves 1550 may have a refractive index about 1.9. Thus, the refractive index modulation in grating layers 1520, 1530, and 1540 may be about 0.1, 0.2, and 0.1, respectively. In examples where there may be four or more grating layers, the grating layer(s) in the middle of the stack may have a higher refractive index modulation than grating layers below or above, the refractive index modulations of which may or may not be symmetrical with respect to the grating layer(s) in the middle of the stack.

The thicknesses and/or the refractive indices of grating layers 1520, 1530, and 1540 may be selected such that the portion of the display light that is coupled out of the waveguide to the ambient environment rather than to the user of the display system may be reduced or minimized, such as less than about 1.0% or less than about 0.5%. For example, the thicknesses and/or the refractive indices of the grating layers may be selected such that the transmissive diffraction or refraction by grating coupler 1500 (used as a reflective grating) may be reduced or minimized. In one example, the thickness of grating layer 1530 may be greater than the thickness of grating layer 1520 and the thickness of grating layer 1540, such as about twice of the thickness of grating layer 1520 or the thickness of grating layer 1540. In one example, the thickness of grating layer 1520 or 1540 may be between about 75 nm and about 85 nm, whereas the thickness of grating layer 1530 may be between about 150 nm and about 170 nm.

FIG. 15B is a diagram including a curve 1560 illustrating the outcoupling efficiency by the reflective diffraction of grating coupler 1500 as a function of the angle of incidence. In the example shown in FIG. 15B, grating layer 1530 may have a refractive index about 1.7, grating layers 1520 and 1540 may have a refractive index about 1.8, while the overcoat layer that fills grating grooves 1550 may have a refractive index about 1.9. Thus, the refractive index modulation in grating layers 1520, 1530, and 1540 may be about 0.1, 0.2, and 0.1, respectively. In FIG. 10B, dashed lines 1562 show the angular range of display light of interest (e.g., display light that may be guided by substrate 1510). Curve 1560 shows that the outcoupling efficiency by the reflective diffraction of grating coupler 1500 may be more than 10% at certain angles of incidence.

FIG. 15C is a diagram including a curve 1570 illustrating the outcoupling efficiency by the transmissive diffraction of grating coupler 1500 as a function of the angle of incidence. The example of grating coupler 1500 shown in FIG. 15C may be the same as the example of grating coupler 1500 shown in FIG. 15B. In FIG. 15C, dashed lines 1572 show the angular range of display light of interest (e.g., display light that may be guided by substrate 1510). Curve 1570 shows that the undesired outcoupling efficiency by the transmissive diffraction of grating coupler 1500 may be close to zero (<<0.1%) in the angular range of the display light of interest. Thus, the undesired outcoupling efficiency is significantly reduced compared with the example shown in FIG. 10C.

Even though not shown in FIGS. 12A and 15A, in some embodiments, the overcoat layer may also include multiple layers of different materials having different refractive indexed. The multiple layers of the overcoat layer may be deposited on the grating coupler in multiple steps, where a different material of a desired thickness may be coated in each steps using, for example, chemical vapor deposition (CVD) or atomic layer deposition (ALD).

In the examples shown in FIGS. 12A and 15A, the grating grooves of a grating coupler may have a uniform depth. In some embodiments, the grating coupler may have a variable etch depth (grating groove depth) as shown in, for example, FIGS. 8A-8B. The grating coupler may include multiple grating layers having a refractive index gradient as described above, where each grating layer may have a uniform or non-uniform thickness.

Figure 16:
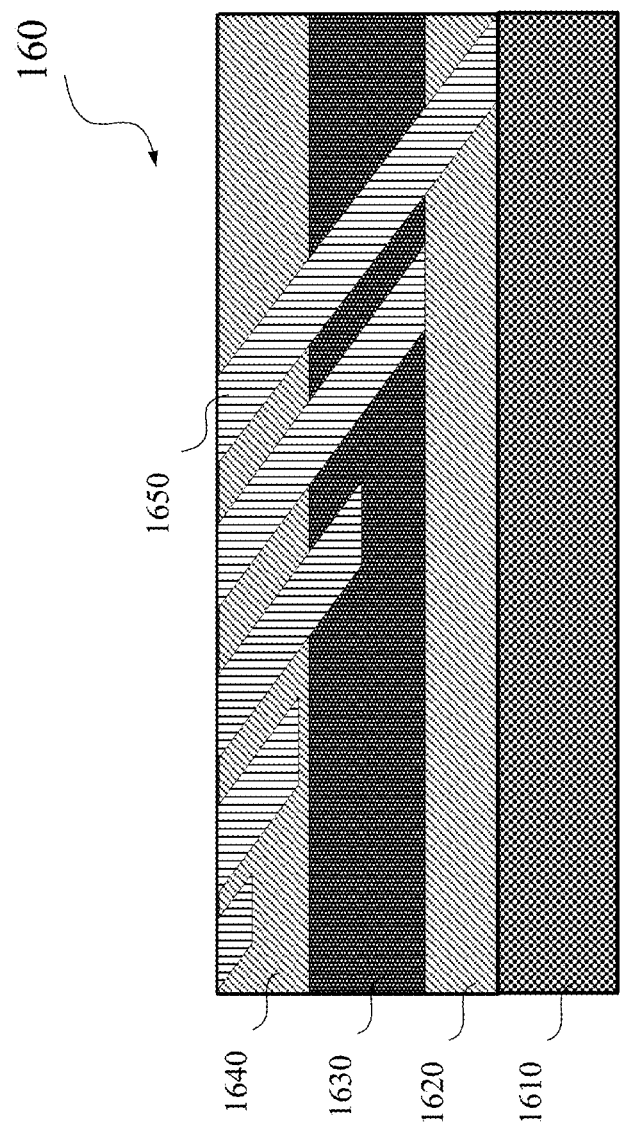
FIG. 16 illustrates an example of a grating coupler with a gradient refractive index and a variable grating depth for a waveguide display according to certain embodiments.

FIG. 16 illustrates an example of a grating coupler 1600 with a refractive index gradient and a variable grating depth for a waveguide display according to certain embodiments. Grating coupler 1600 may include multiple grating layers, such as grating layers 1620, 1630, and 1640, formed on a substrate 1610. Even though three grating layers are shown in the example, the multiple grating layers may include two or more layers, such as four or more layers. The multiple grating layers may have the same or different thicknesses. The multiple grating layers may be characterized by different refractive indices. A plurality of grating grooves 1650 may be etched in the multiple grating layers and may be coated with an overcoat layer as described above. The etching may be slanted etching, such that grating grooves 1650 may be slanted to form a slanted grating.

In grating coupler 1600, grating layer 1630 may have a lower refractive index than grating layer 1620 and grating layer 1640. Grating layer 1630 may also have a refractive index lower than the refractive index of substrate 1610. In one example, substrate 1610 may have a refractive index between about 1.9 and about 2.0, grating layer 1620 may have a refractive index about 1.9, grating layer 1630 may have a refractive index between about 2.0 and about 2.1, grating layer 1640 may have a refractive index about 1.9, while the overcoat layer that fills grating grooves 1650 may have a refractive index about 1.8. Thus, the refractive index modulation in grating layers 1620, 1630, and 1640 may be about 0.1, 0.2-0.3, and 0.1, respectively. In another example, grating layer 1620 may have a refractive index about 1.8, grating layer 1630 may have a refractive index between about 1.7, grating layer 1640 may have a refractive index about 1.8, while the overcoat layer that fills grating grooves 1650 may have a refractive index about 1.9. Thus, the refractive index modulation in grating layers 1620, 1630, and 1640 may be about 0.1, 0.2, and 0.1, respectively. In examples where there may be four or more grating layers, the grating layer(s) in the middle of the stack may have a higher refractive index modulation than grating layers below or above, the refractive index modulations of which may or may not be symmetrical with respect to the grating layer(s) in the middle of the stack.

The thicknesses and/or the refractive indices of grating layers 1620, 1630, and 1640 may be selected such that the portion of the display light that is coupled out of the waveguide to the ambient environment rather than to the user of the display system may be reduced or minimized, such as less than about 1.0% or less than about 0.5%. For example, the thicknesses and/or the refractive indices of the grating layers may be selected such that the transmissive diffraction or refraction by grating coupler 1600 (used as a reflective grating) may be reduced or minimized. In one example, the thickness of grating layer 1630 may be greater than the thickness of grating layer 1620 and the thickness of grating layer 1640, such as about twice of the thickness of grating layer 1620 or the thickness of grating layer 1640. In one example, the thickness of grating layer 1620 or 1640 may be between about 75 nm and about 85 nm, whereas the thickness of grating layer 1630 may be between about 150 nm and about 170 nm.

In the example shown in FIG. 16, a gray-scale mask and a photoresist layer with a linear response to exposure dosage may be used to form a desired depth profile in the photoresist layer, which may then be used, in combination with a patterned hard mask, as the etch mask in an etching process (e.g., a dry etching process) to transfer the depth profile into the multiple grating layers. The etching may be slanted etching, such that grating grooves 1650 may be slanted to form a slanted grating. As described above, after the etching, an overcoat layer with a desired refractive index may be formed on grating coupler 1600 to fill grating grooves 1650.

FIGS. 17A-17E illustrate an example of a process 1700 for fabricating a grating coupler with a gradient refractive index and a variable grating depth according to certain embodiments. FIG. 17A shows a substrate 1710 (e.g., a glass substrate) with multiple grating layers 1720, 1730, 1740, and the like formed thereon. Even though three grating layers are shown in the example, the multiple grating layers may include two or more layers. Grating layers 1720, 1730, 1740, and the like may have different refractive indices and/or different thicknesses. In the example shown in FIG. 17A, grating layer 1730 may include SiN and may have a refractive index about 2.0 or 2.1, and grating layers 1720 and 1740 may have refractive indices greater than or lower than the refractive index of grating layer 1730. In one example, grating layers 1720 and 1740 may have a same refractive index, for example, about 1.9.

FIG. 17B shows mask layers formed on the grating layers. The mask layers may include, for example, a hard mask material layer 1750 (e.g., a metal or metal alloy material, such as Cr) and a tri-layer mask formed on the hard mask material layer. The tri-layer mask may be used to pattern hard mask material layer 1750. The tri-layer mask may include, for example, an organic dielectric layer (ODL) 1760 at the bottom, a silicon-containing hard mask bottom (SHB) anti-reflection coating layer 1770 in the middle, and a photoresist (PR) layer 1780 at the top. FIG. 17B shows that photoresist layer 1780 has been patterned using, for example, photolithography techniques.

FIG. 17C shows that an etching process is performed to remove parts of the tri-layer mask and parts of hard mask material layer 1750 to form opening 1772 in the mask layers, so as to form a pattern in hard mask material layer 1750. FIG. 17D shows that the tri-layer mask has been removed to expose the patterned hard mask material layer 1750.

FIG. 17E shows that an etch mask 1790 is formed on the patterned hard mask material layer 1750. Etch mask 1790 may have a desired height or thickness profile and may be formed using a gray-tone mask and in a photoresist material layer that has a linear response to exposure dosage. Because of the gray-tone mask, different regions of the photoresist material layer may be exposed to different exposure doses and thus the depths of the exposed photoresist material in different regions may be different as well. Etch mask 1790 may be formed after the development of the photoresist material to remove the exposed photoresist material, and thus may have the desired height or thickness profile.

FIG. 17F shows that a slanted etching process is performed using etch mask 1790 and patterned hard mask material layer 1750 to transfer the pattern in pattern hard mask material layer 1750 and the height profile of etch mask 1790 into the grating layers. Thus, a plurality of grating grooves 1742 may be formed in grating layers 1720-1740. The etching process may include a dry etching process, such as ion or plasma etching (e.g., ion beam etching (IBE), plasma etching (PE), or reactive ion etching (RIE)). The ion or plasma beam may be slanted with respect to the surface normal of grating layers 1720-1740, such that grating grooves 1742 may be slanted to form a slanted grating in the grating layers. After the etching, the remaining etch mask 1790 (if any) and patterned hard mask material layer 1750 may be removed, and the slanted grating may be coated with an overcoat layer as described above. The overcoat layer may have a refractive index, for example, about 1.8.

In the examples shown above, each grating layer of the multiple grating layers may have a uniform thickness, and a uniform or variable height etch mask may be used to etch the grating layers to achieve uniform or variable etch depths in the grating layers. In some embodiments, one or more grating layers of the multiple grating layers may have non-uniform thickness profiles, and thus the overall thickness of the multiple grating layers may be non-uniform. In such embodiments, the etching (e.g., slanted dry etching) may be performed using the substrate as the etch stop layer to form a slanted grating with a variable etch depth (and thickness) and a variable effective refractive index.

Figure 18:
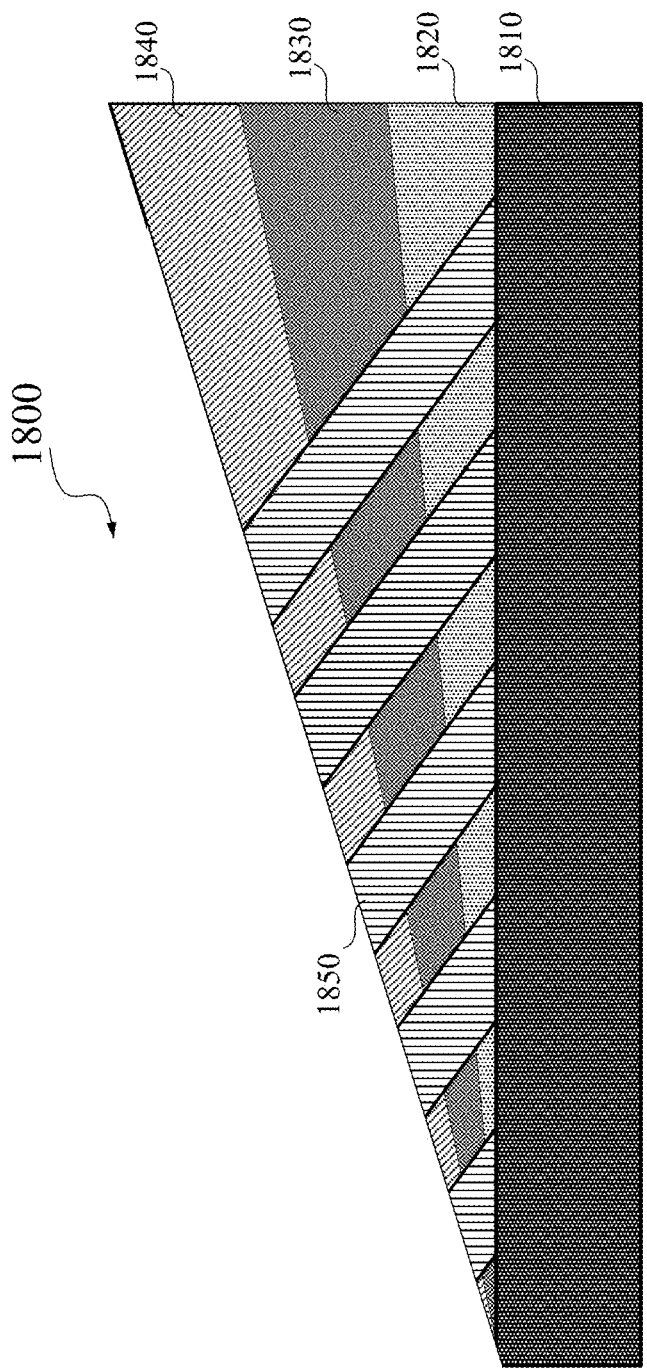
FIG. 18 illustrates an example of a grating coupler with a variable grating depth in multiple layers that have different thickness profiles and different refractive indices for reducing display light leakage in a waveguide display according to certain embodiments.

FIG. 18 illustrates an example of a grating coupler 1800 with a variable grating depth in multiple layers that have different thickness profiles and different refractive indices for reducing display light leakage in a waveguide display according to certain embodiments. Grating coupler 1800 may include multiple grating layers, such as grating layers 1820, 1830, and 1840, formed on a substrate 1810 (e.g., a glass substrate). Even though three grating layers are shown in the example, the multiple grating layers may include two or more layers, such as four or more layers.

In grating coupler 1800, grating layer 1830 may have a higher or lower refractive index than grating layer 1820 and grating layer 1840. Grating layer 1830 may also have a refractive index higher or lower than the refractive index of substrate 1810. In one example, substrate 1810 may have a refractive index between about 1.9 and about 2.0, grating layer 1820 may have a refractive index about 1.9, grating layer 1830 may have a refractive index between about 2.0 and about 2.1, grating layer 1840 may have a refractive index about 1.9, while the overcoat layer that fills grating grooves 1850 may have a refractive index about 1.8. Thus, the refractive index modulation in grating layers 1820, 1830, and 1840 may be about 0.1, 0.2-0.3, and 0.1, respectively. In another example, grating layer 1820 may have a refractive index about 1.8, grating layer 1830 may have a refractive index between about 1.7, grating layer 1840 may have a refractive index about 1.8, while the overcoat layer that fills grating grooves 1850 may have a refractive index about 1.9. Thus, the refractive index modulation in grating layers 1820, 1830, and 1840 may be about 0.1, 0.2, and 0.1, respectively. In examples where there may be four or more grating layers, the grating layer(s) in the middle of the stack may have a higher refractive index modulation than grating layers below or above, the refractive index modulations of which may or may not be symmetrical with respect to the grating layer(s) in the middle of the stack.

In the example shown in FIG. 18, each grating layer in grating layers 1820, 1830, and 1840 may have a non-uniform thickness profile, and the grating layers may have a same thickness or different thicknesses in a same x and/or y coordinate. Thus, grating coupler 1800 may have a variable thickness in one or two dimensions. The non-uniform grating layers may be formed using a gray-tone mask and a photoresist material that has a linear response to exposure dosage as described above and in more detail below.

A plurality of grating grooves 1850 may be etched in the multiple grating layers. In the example shown in FIG. 18, substrate 1810 may be used as the etch stop layer. Because the multiple grating layers may have a variable overall thickness, grating grooves 1850 may have different depths at different regions of the grating layers. The etching may be slanted etching, such as ion or plasma etching (e.g., IBE, PE, or RIE), such that grating grooves 1850 may be slanted to form a slanted grating. As described above, in some embodiments, an overcoat layer with a desired refractive index may be formed on grating coupler 1800 to fill grating grooves 1850.

Grating coupler 1800 may be used to reduce the leakage of display light in an optical see-through waveguide display. For example, the thickness profiles and/or the refractive indices of grating layers 1820, 1830, and 1840 may be selected such that the portion of the display light that is coupled out of the waveguide to the ambient environment rather than to the user of the display system may be reduced or minimized to, for example, less than about 1.0%, such as about 0.5% or lower. In one example, the thickness profiles and/or the refractive indices of grating layers 1820, 1830, and 1840 may be selected such that the transmissive diffraction or refraction by grating coupler 1800 (used as a reflective grating coupler) may be reduced or minimized.

FIGS. 19A-19K illustrate an example of a process 1900 for manufacturing a grating coupler (e.g., grating coupler 1800) with a variable grating depth in multiple grating layers that have different thickness profiles and different refractive indices for reducing display light leakage in a waveguide display according to certain embodiments. FIG. 19A shows a substrate 1910, which may be a transparent substrate, such as a glass substrate. Substrate 1910 may be flat or may be curved. For example, substrate 1910 may include a lens, such as a vision correction lens or a lens for correcting one or more types of optical errors. Substrate 1910 may have a first refractive index, for example, from about 1.45 to about 2.4, such as about 1.9.

FIG. 19B illustrates a first material layer 1920 deposited on substrate 1910, and a gray-scale photoresist layer 1922 formed on first material layer 1920. First material layer 1920 may include a uniform layer of a material having a second refractive index, such as close to the first refractive index. First material layer 1920 may include, for example, a semiconductor material, a dielectric material, a polymer, and the like. In one example, first material layer 1920 may include an oxide, which may have a refractive index about 1.9. First material layer 1920 may be deposited on substrate 1910 by, for example, spin coating, physical vapor deposition (PVD), chemical vapor deposition (CVD) (e.g., low pressure chemical vapor deposition (LPCVD) or plasma-enhanced chemical vapor deposition (PECVD)), and the like. Gray-scale photoresist layer 1922 may include a desired thickness profile, such as a ramp-shaped profile, which may be made by depositing a layer of gray-scale photoresist, exposing the layer of gray-scale photoresist to light using a gray-scale mask that has different transmissivities at different regions, and developing the layer of gray-scale photoresist after exposure to remove the exposed portion of the gray-scale photoresist.

FIG. 19C illustrates a first grating layer 1924 including the first material and having a variable thickness. First grating layer 1924 may be formed by etching gray-scale photoresist layer 1922 and first material layer 1920 to linearly or nonlinearly transfer the height profile of gray-scale photoresist layer 1922 into first material layer 1920. The etching may be, for example, vertical dry etching using ion or plasma beams as described above. The etch time may be controlled to achieve the desired thickness of first grating layer 1924. Gray-scale photoresist layer 1922 may be completely etched by the etching process, or may not be fully etched by the etching process and may be removed by a photoresist stripping process using, for example, an organic or inorganic stripper.

FIG. 19D illustrates a second material layer 1930 deposited on first grating layer 1924, and a gray-scale photoresist layer 1932 formed on second material layer 1930. Second material layer 1930 may include a material having a third refractive index, such as lower than the second refractive index. Second material layer 1930 may include, for example, a semiconductor material, a dielectric material, a polymer, and the like. In one example, second material layer 1930 may include SiN, which may have a refractive index between about 2.0 and 2.1. Second material layer 1930 may be deposited on first grating layer 1924 using various techniques described above. Gray-scale photoresist layer 1932 may include a desired thickness profile, such as a ramp-shaped profile, and may be made using techniques described above with respect to gray-scale photoresist layer 1922.

FIG. 19E illustrates a second grating layer 1934 including the second material and having a variable thickness. Second grating layer 1934 may be formed by etching gray-scale photoresist layer 1932 and second material layer 1930 to linearly or nonlinearly transfer the height profile of gray-scale photoresist layer 1932 into second material layer 1930. The etching may be, for example, vertical dry etching using ion or plasma beams as described above. The etch time may be controlled to achieve the desired thickness of second grating layer 1934. Gray-scale photoresist layer 1932 may be completely etched by the etching process, or may not be fully etched by the etching process and may be removed by a photoresist stripping process using, for example, an organic or inorganic stripper.

FIG. 19F illustrates a third material layer 1940 deposited on second grating layer 1934, and a gray-scale photoresist layer 1942 formed on third material layer 1940. Third material layer 1940 may include a material having a fourth refractive index, such as lower than the third refractive index. Third material layer 1940 may include, for example, a semiconductor material, a dielectric material, a polymer, and the like. In one example, second material layer 1930 may include an oxide or a polymer, which may have a refractive index, for example, about 1.9. Third material layer 1940 may be deposited on second grating layer 1934 using techniques described above. Gray-scale photoresist layer 1942 may include a desired thickness profile, such as a ramp-shaped profile, and may be made using techniques described above with respect to gray-scale photoresist layer 1922.

FIG. 19G illustrates a third grating layer 1944 including the third material and having a variable thickness. Third grating layer 1944 may be formed by etching gray-scale photoresist layer 1942 and third material layer 1940 to linearly or nonlinearly transfer the height profile of gray-scale photoresist layer 1942 into third material layer 1940. The etching may be, for example, vertical dry etching using ion or plasma beams as described above. The etch time may be controlled to achieve the desired thickness of third grating layer 1944. Gray-scale photoresist layer 1942 may be completely etched by the etching process, or may not be fully etched by the etching process and may be removed by a photoresist stripping process using, for example, an organic or inorganic stripper. As shown in FIG. 19G, three grating layers 1924, 1934, and 1944 may be formed on substrate 1910, where each grating layer may have a variable thickness and may have a respective refractive index. In some embodiments, more than three grating layers may be formed on substrate 1910 using the techniques described above. At least some of the grating layers may have a variable thickness and at least some of the grating layers may have different respective refractive indices.

FIG. 19H illustrates examples of mask layers formed on the grating layers. The mask layers may include, for example, a hard mask material layer 1950 (e.g., a metal or metal alloy material, such as Cr) and a tri-layer mask formed on the hard mask material layer. As described above with respect to FIG. 12B, the tri-layer mask may be used to pattern hard mask material layer 1950 and may include, for example, an organic dielectric layer 1952 at the bottom, a silicon-containing hard mask bottom anti-reflection coating layer 1954 in the middle, and a photoresist layer 1956 at the top. FIG. 19H shows that photoresist layer 1956 has been patterned using, for example, photolithography techniques.

FIG. 19I shows that a dry or wet etching process is performed to remove parts of the tri-layer mask and parts of hard mask material layer 1950 to form opening 1958 in the mask layers, so as to form a pattern in hard mask material layer 1950. In the example shown in FIG. 19I, third grating layer 1944 may be used as the etch stop layer. FIG. 19J shows that the tri-layer mask has been removed to expose the patterned hard mask material layer 1950.

FIG. 19K shows that a slanted etching process is performed using the patterned hard mask material layer 1950, where substrate 1910 may be used as an etch stop layer. Thus, the multiple grating layers may be etched down to substrate 1910 to form a plurality of grating grooves 1948 in grating layers 1924, 1934, and 1944. The etching process may include a dry etching process, such as ion or plasma etching (e.g., IBE, PE, or RIE). The ion or plasma beam may be slanted with respect to the surface normal of substrate 1910, such that grating grooves 1948 may be slanted with respect to substrate 1910 to form a slanted grating in the grating layers. Because of the variable overall thicknesses of the multiple grating layers, the grating formed in the grating layers may be a grating with a variable depth. After the etching, patterned hard mask material layer 1950 may be removed as shown in FIG. 19K. In some embodiments, the slanted grating may be coated with an overcoat layer (not shown in FIG. 19K) as described above.

Figure 20:
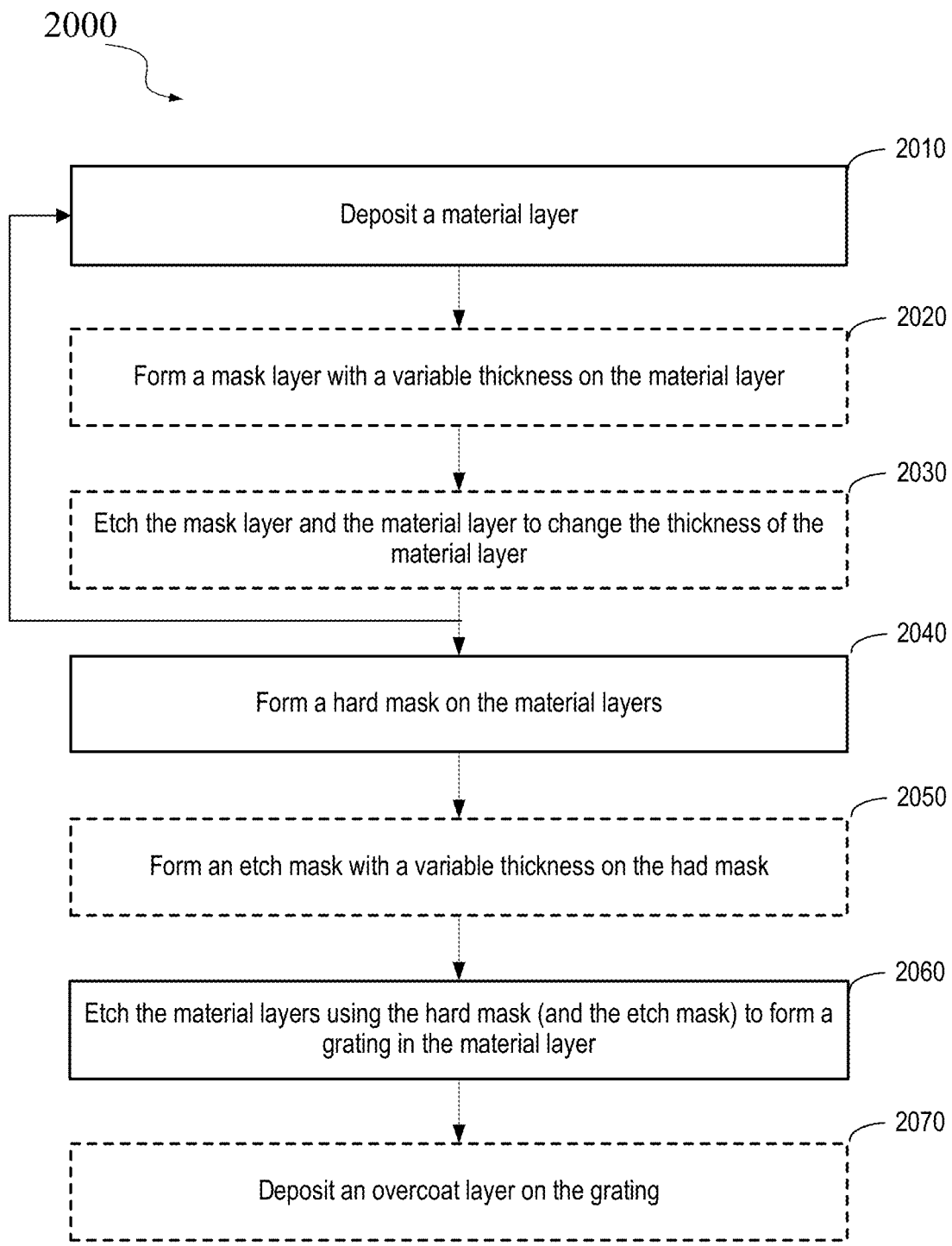
FIG. 20 is a flow chart illustrating an example of a process for fabricating a grating coupler with a gradient refractive index according to certain embodiments.

FIG. 20 is a flow chart illustrating an example of a process for fabricating a grating coupler with a gradient refractive index according to certain embodiments. The operations described in flow chart 2000 are for illustration purposes only and are not intended to be limiting. In various implementations, modifications may be made to flow chart 2000 to add additional operations, to omit some operations, or to change the order of the operations. The operations described in flow chart 2000 may be performed by, for example, one or more semiconductor fabrication systems, such as a spin coating system, a CVD system, a PVD system, an ion or plasma etching (e.g., IBE, PE, or RIE) system, a photolithography system, and the like.

At block 2010, a material layer may be deposited on a substrate as described above with respect to, for example, FIGS. 17A and 19B. The substrate may be a transparent substrate, such as a glass substrate. The substrate may be flat or may be curved, and may include, for example, a lens, such as a vision correction lens or a lens for correcting one or more types of optical errors. The substrate may include a material having a first refractive index, for example, from about 1.45 to about 2.4, such as about 1.9. The material layer may include a uniform layer of a material having a second refractive index, such as close to the first refractive index. The material layer may include, for example, a semiconductor material, a dielectric material, a polymer, and the like. The material layer may be deposited on the substrate by, for example, spin coating, PVD, CVD (such as LPCVD or PECVD), and the like.

Optionally, at block 2020, a mask layer with a variable thickness may be formed on the material layer. The mask layer may include a desired thickness profile, such as a ramp-shaped profile as shown in FIG. 19B or another profile with variations in one or two dimensions. The mask layer may be made by depositing a layer of gray-scale photoresist that may have a linear response to exposure dosage, exposing the layer of gray-scale photoresist to light using a gray-scale mask that has different transmissivities at different regions, and developing the layer of gray-scale photoresist after exposure to remove the exposed portions of the photoresist.

Optionally, at block 2030, the mask layer and the material layer may be etched to change the thickness of the material layer by linearly or nonlinearly transferring the thickness profile of the mask layer into the material layer, for example, as shown in FIG. 19C. The etching may be, for example, vertical dry etching using ion or plasma beams as described above. The etch time may be controlled to achieve the desired thickness of the remaining material layer. The mask layer may be completely etched by the etching process, or may not be fully etched by the etching process and may be removed by a photoresist stripping process using, for example, an organic or inorganic stripper.

The operations at block 2010 and/or blocks 2020-2030 may be repeated to form additional material layers on the substrate as shown in, for example, FIG. 17A and FIGS. 19D-19G. The additional material layers may include different respective materials with different respective refractive indices. Thus, the material layers may form a structure with a refractive index gradient. For example, in some embodiments (e.g., where the overcoat layer has a lower refractive index), the refractive index of the structure may gradually increase and then gradually decrease with the increase in the distance from the substrate. In some embodiments (e.g., where the overcoat layer has a higher refractive index), the refractive index of the structure may gradually decrease and then gradually increase with the increase in the distance from the substrate. In some embodiments, the material layers may have different respective thickness profiles such that the grating fabricated in the material layers may reduce the leakage of the display light as described above.

At block 2040, a hard mask may be formed on the material layers. The hard mask may include, for example, a hard mask material layer (e.g., a metal or metal alloy material, such as Cr). As described above with respect to, for example, FIGS. 17B-17D and FIGS. 19H-19J, the hard mask may be formed using, for example, a tri-layer mask that includes an ODL layer, a SHB anti-reflection coating layer, and a photoresist layer. The photoresist layer may be patterned and used as the mask to etch the SHB anti-reflection coating layer, the ODL layer, and the hard mask material layer to form the hard mask with a desired light transmissivity pattern.

Optionally, at block 2050, an etch mask with a variable thickness may be form on the hard mask as described above with respect to, for example, FIG. 17E. The etch mask with the variable thickness may be formed by depositing a layer of gray-scale photoresist that may have a linear response to exposure dosage, exposing the layer of gray-scale photoresist to light using a gray-scale mask that has different transmissivities at different regions, and developing the layer of gray-scale photoresist after exposure to remove the exposed portions of the photoresist, as described above with respect to block 2020.

At block 2060, the material layers may be etched using the hard mask (and the etch mask if present) to form a grating in the material layers. The etching may be vertical or slanted etching. For example, in some embodiments, the etching may be slanted etching using ion or plasma beams. In some embodiments, the etch time may be controlled to achieve the desired depth for the grating as shown in, for example, FIG. 16 and FIG. 17F. In some embodiments, the material layers may have a variable overall thickness, the substrate or another layer may be used as the etch stop layer for etching through the material layers as shown in, for example, FIG. 12A and FIG. 19K, and thus the etch time may not need to be precisely controlled.

Optionally, at block 2070, an overcoat layer with a desired refractive index may be formed on the etched grating to fill the grating grooves. For example, in some embodiments, a high refractive index material, such as Hafnia, Titania, Tantalum oxide, Tungsten oxide, Zirconium oxide, Gallium sulfide, Gallium nitride, Gallium phosphide, silicon, or a high refractive index polymer, may be used to fill the grating grooves. In some embodiments, a lower refractive index material, such as silicon oxide, alumina, porous silica, or fluorinated low index monomer (or polymer), may be used to fill the grating grooves.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 21:
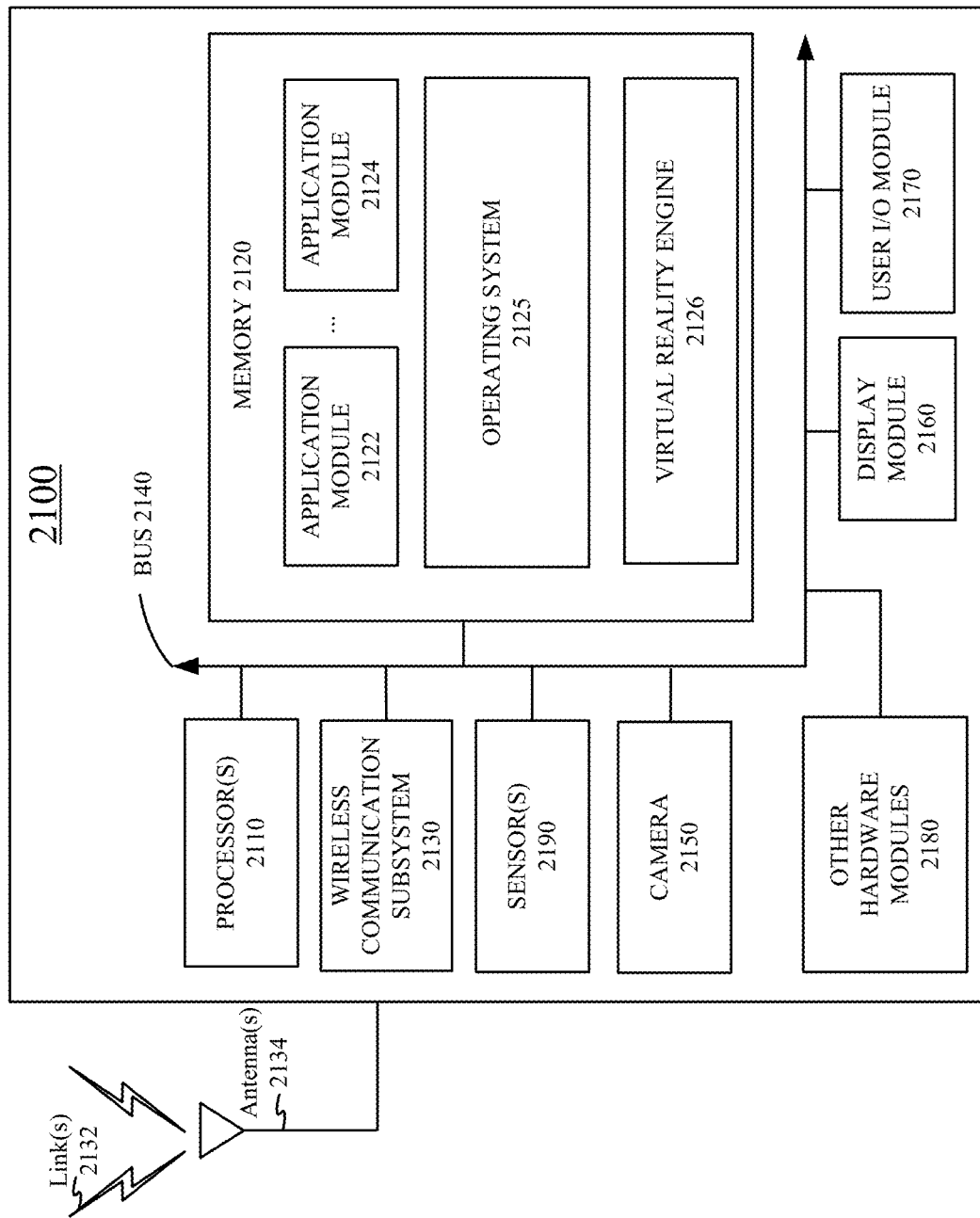
FIG. 21 is a simplified block diagram of an example electronic system of an example near-eye display for implementing some of the examples disclosed herein.

FIG. 21 is a simplified block diagram of an example electronic system 2100 of an example near-eye display (e.g., HMD device) for implementing some of the examples disclosed herein. Electronic system 2100 may be used as the electronic system of an HMD device or other near-eye displays described above. In this example, electronic system 2100 may include one or more processor(s) 2110 and a memory 2120. Processor(s) 2110 may be configured to execute instructions for performing operations at a number of components, and can be, for example, a general-purpose processor or microprocessor suitable for implementation within a portable electronic device. Processor(s) 2110 may be communicatively coupled with a plurality of components within electronic system 2100. To realize this communicative coupling, processor(s) 2110 may communicate with the other illustrated components across a bus 2140. Bus 2140 may be any subsystem adapted to transfer data within electronic system 2100. Bus 2140 may include a plurality of computer buses and additional circuitry to transfer data.

Memory 2120 may be coupled to processor(s) 2110. In some embodiments, memory 2120 may offer both short-term and long-term storage and may be divided into several units. Memory 2120 may be volatile, such as static random access memory (SRAM) and/or dynamic random access memory (DRAM) and/or non-volatile, such as read-only memory (ROM), flash memory, and the like. Furthermore, memory 2120 may include removable storage devices, such as secure digital (SD) cards. Memory 2120 may provide storage of computer-readable instructions, data structures, program modules, and other data for electronic system 2100. In some embodiments, memory 2120 may be distributed into different hardware modules. A set of instructions and/or code might be stored on memory 2120. The instructions might take the form of executable code that may be executable by electronic system 2100, and/or might take the form of source and/or installable code, which, upon compilation and/or installation on electronic system 2100 (e.g., using any of a variety of generally available compilers, installation programs, compression/decompression utilities, etc.), may take the form of executable code.

In some embodiments, memory 2120 may store a plurality of application modules 2122 through 2124, which may include any number of applications. Examples of applications may include gaming applications, conferencing applications, video playback applications, or other suitable applications. The applications may include a depth sensing function or eye tracking function. Application modules 2122-2124 may include particular instructions to be executed by processor(s) 2110. In some embodiments, certain applications or parts of application modules 2122-2124 may be executable by other hardware modules 2180. In certain embodiments, memory 2120 may additionally include secure memory, which may include additional security controls to prevent copying or other unauthorized access to secure information.

In some embodiments, memory 2120 may include an operating system 2125 loaded therein. Operating system 2125 may be operable to initiate the execution of the instructions provided by application modules 2122-2124 and/or manage other hardware modules 2180 as well as interfaces with a wireless communication subsystem 2130 which may include one or more wireless transceivers. Operating system 2125 may be adapted to perform other operations across the components of electronic system 2100 including threading, resource management, data storage control and other similar functionality.

Wireless communication subsystem 2130 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2100 may include one or more antennas 2134 for wireless communication as part of wireless communication subsystem 2130 or as a separate component coupled to any portion of the system. Depending on desired functionality, wireless communication subsystem 2130 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2130 may permit data to be exchanged with a network, other computer systems, and/or any other devices described herein. Wireless communication subsystem 2130 may include a means for transmitting or receiving data, such as identifiers of HMD devices, position data, a geographic map, a heat map, photos, or videos, using antenna(s) 2134 and wireless link(s) 2132. Wireless communication subsystem 2130, processor (s) 2110, and memory 2120 may together comprise at least a part of one or more of a means for performing some functions disclosed herein.

Embodiments of electronic system 2100 may also include one or more sensors 2190. Sensor(s) 2190 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2190 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2100 may include a display module 2160. Display module 2160 may be a near-eye display, and may graphically present information, such as images, videos, and various instructions, from electronic system 2100 to a user. Such information may be derived from one or more application modules 2122-2124, virtual reality engine 2126, one or more other hardware modules 2180, a combination thereof, or any other suitable means for resolving graphical content for the user (e.g., by operating system 2125). Display module 2160 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2100 may include a user input/output module 2170. User input/output module 2170 may allow a user to send action requests to electronic system 2100. An action request may be a request to perform a particular action. For example, an action request may be to start or end an application or to perform a particular action within the application. User input/output module 2170 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2100. In some embodiments, user input/output module 2170 may provide haptic feedback to the user in accordance with instructions received from electronic system 2100. For example, the haptic feedback may be provided when an action request is received or has been performed.

Electronic system 2100 may include a camera 2150 that may be used to take photos or videos of a user, for example, for tracking the user's eye position. Camera 2150 may also be used to take photos or videos of the environment, for example, for VR, AR, or MR applications. Camera 2150 may include, for example, a complementary metal-oxide-semiconductor (CMOS) image sensor with a few millions or tens of millions of pixels. In some implementations, camera 2150 may include two or more cameras that may be used to capture 3-D images.

In some embodiments, electronic system 2100 may include a plurality of other hardware modules 2180. Each of other hardware modules 2180 may be a physical module within electronic system 2100. While each of other hardware modules 2180 may be permanently configured as a structure, some of other hardware modules 2180 may be temporarily configured to perform specific functions or temporarily activated. Examples of other hardware modules 2180 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2180 may be implemented in software.

In some embodiments, memory 2120 of electronic system 2100 may also store a virtual reality engine 2126. Virtual reality engine 2126 may execute applications within electronic system 2100 and receive position information, acceleration information, velocity information, predicted future positions, or some combination thereof of the HMD device from the various sensors. In some embodiments, the information received by virtual reality engine 2126 may be used for producing a signal (e.g., display instructions) to display module 2160. For example, if the received information indicates that the user has looked to the left, virtual reality engine 2126 may generate content for the HMD device that mirrors the user's movement in a virtual environment. Additionally, virtual reality engine 2126 may perform an action within an application in response to an action request received from user input/output module 2170 and provide feedback to the user. The provided feedback may be visual, audible, or haptic feedback. In some implementations, processor(s) 2110 may include one or more GPUs that may execute virtual reality engine 2126.

In various implementations, the above-described hardware and modules may be implemented on a single device or on multiple devices that can communicate with one another using wired or wireless connections. For example, in some implementations, some components or modules, such as GPUs, virtual reality engine 2126, and applications (e.g., tracking application), may be implemented on a console separate from the head-mounted display device. In some implementations, one console may be connected to or support more than one HMD.

In alternative configurations, different and/or additional components may be included in electronic system 2100. Similarly, functionality of one or more of the components can be distributed among the components in a manner different from the manner described above. For example, in some embodiments, electronic system 2100 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
   a waveguide;
   an input coupler configured to couple display light into the waveguide; and
   one or more surface-relief gratings on the waveguide and configured to couple the display light out of the waveguide towards an eyebox of the waveguide display on a first side of the waveguide, the one or more surface-relief gratings formed in a plurality of grating layers, wherein the plurality of grating layers includes:

a first grating layer characterized by a first thickness profile and a first refractive index;

a second grating layer characterized by a second thickness profile and a second refractive index different from the first refractive index; and a third grating layer characterized by a third thickness profile and a third refractive index different from the second refractive index, the second grating layer between the first grating layer and the third grating layer, wherein the one or more surface-relief gratings include a grating groove etched into the first grating layer, the second grating layer, and the third grating layer;

wherein at least one of the first grating layer, the second grating layer, or the third grating layer has a non-uniform thickness profile; and wherein the first thickness profile, the first refractive index, the second thickness profile, the second refractive index, the third thickness profile, and the third refractive index are configured to reduce coupling of the display light to a second side of the waveguide opposing the first side.

2. The waveguide display of claim 1, wherein the plurality of grating layers is characterized by a refractive index modulation that increases and then decreases with an increase in a distance from the waveguide.

3. The waveguide display of claim 1, wherein the second refractive index is greater than each of the first refractive index, the third refractive index, and a fourth refractive index of the waveguide.

4. The waveguide display of claim 1, wherein:
the second refractive index is lower than each of the first refractive index and the third refractive index; and
the first refractive index is the same as or different from the third refractive index.

5. The waveguide display of claim 1, wherein the plurality of grating layers is characterized by a refractive index that increases and then decreases with an increase in a distance from the waveguide.

6. The waveguide display of claim 1, wherein the plurality of grating layers is characterized by a refractive index that decreases and then increases with an increase in a distance from the waveguide.

7. The waveguide display of claim 1, wherein the second grating layer is characterized by a refractive index modulation greater than 0.1.

8. The waveguide display of claim 1, wherein an efficiency of the coupling of the display light to the second side of the waveguide is less than 1.0%.

9. The waveguide display of claim 1, wherein the first thickness profile is different from the second thickness profile.

10. The waveguide display of claim 1, wherein the first thickness profile includes a non-uniform thickness profile in one or two dimensions.

11. The waveguide display of claim 1, wherein the one or more surface-relief gratings comprise a slanted surface-relief grating including a plurality of grating grooves in the plurality of grating layers.

12. The waveguide display of claim 11, wherein the plurality of grating grooves is characterized by non-uniform depths.

13. The waveguide display of claim 12, wherein each of the plurality of grating grooves extends through all grating layers in the plurality of grating layers.

14. The waveguide display of claim 11, wherein the one or more surface-relief gratings further comprise an overcoat layer on the plurality of grating layers, the overcoat layer filling the plurality of grating grooves and characterized by a fourth refractive index different from the first refractive index, the second refractive index, and the third refractive index.

15. The waveguide display of claim 1, wherein at least one surface-relief grating of the one or more surface-relief gratings is characterized by at least one of a non-uniform grating period or a non-uniform duty cycle.

16. A surface-relief grating coupler comprising:
a substrate;
a plurality of grating layers on the substrate, the plurality of grating layers including:
a first grating layer characterized by a first thickness profile and a first refractive index;
a second grating layer characterized by a second thickness profile and a second refractive index different from the first refractive index;
a third grating layer characterized by a third thickness profile and a third refractive index different from the second refractive index, the second grating layer between the first grating layer and the third grating layer; and
a plurality of grating grooves etched into the plurality of grating layers, the plurality of grating grooves slanted with respect to the substrate and characterized by non-uniform depths, wherein a grating groove of the plurality of grating grooves is etched into the first grating layer, the second grating layer, and the third grating layer, and wherein opposing sidewalls of the grating groove are slanted in a same direction with respect to the substrate; and
an overcoat layer on the plurality of grating layers, the overcoat layer filling the plurality of grating grooves.

17. The surface-relief grating coupler of claim 16, wherein the plurality of grating layers is characterized by a refractive index modulation that increases and then decreases with an increase in a distance from the substrate.

18. The surface-relief grating coupler of claim 16, wherein:
the first thickness profile includes a first non-uniform thickness profile; and
the second thickness profile includes a second non-uniform thickness profile.

19. The surface-relief grating coupler of claim 16, wherein each of the plurality of grating grooves extends through all grating layers in the plurality of grating layers.

20. The surface-relief grating coupler of claim 16, wherein the plurality of grating grooves is characterized by at least one of non-uniform depths, non-uniform pitches, or non-uniform widths.

* * * * *